(12) United States Patent
Asterjadhi et al.

(10) Patent No.: US 10,616,884 B2
(45) Date of Patent: Apr. 7, 2020

(54) TECHNIQUES FOR SIGNALING A TRANSMIT POWER HEADROOM IN A CONTROL FIELD

(71) Applicant: QUALCOMM Incorporated, San Diego, CA (US)

(72) Inventors: Alfred Asterjadhi, San Diego, CA (US); Bin Tian, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 168 days.

(21) Appl. No.: 15/643,358

(22) Filed: Jul. 6, 2017

(65) Prior Publication Data

US 2018/0014302 A1    Jan. 11, 2018

Related U.S. Application Data

(60) Provisional application No. 62/360,302, filed on Jul. 8, 2016, provisional application No. 62/466,341, filed on Mar. 2, 2017.

(51) Int. Cl.
*H04W 72/04* (2009.01)
*H04W 52/36* (2009.01)
*H04W 84/12* (2009.01)

(52) U.S. Cl.
CPC ..... *H04W 72/0446* (2013.01); *H04W 52/365* (2013.01); *H04W 84/12* (2013.01)

(58) Field of Classification Search
None
See application file for complete search history.

(56) References Cited

U.S. PATENT DOCUMENTS

2011/0243016 A1* 10/2011 Zhang ................ H04W 52/365
                                                                 370/252
2013/0170345 A1*  7/2013 Merlin ................ H04L 1/0029
                                                                 370/230

(Continued)

FOREIGN PATENT DOCUMENTS

WO    WO-2013169389 A1    11/2013

OTHER PUBLICATIONS

ISA/EP, International Search Report and Written Opinion of the International Searching Authority, Int'l Application No. PCT/US2017/041222, dated Sep. 14, 2017, European Patent Office, Rijswijk, NL, 15 pgs.

(Continued)

*Primary Examiner* — Xavier S Wong
(74) *Attorney, Agent, or Firm* — Steven R. Thiel

(57) ABSTRACT

Techniques for wireless communication at a station are described. One method for wireless communication at a station includes identifying a plurality of control parameters including at least one of a transmit power headroom parameter of the station, a buffer status report of the station, a transmit parameter of the station, a receive parameter of the station, channel quality information, a link parameter, or a combination thereof. The method may further include identifying a soliciting frame received from a second station, determining an allocation of resources for a physical layer convergence protocol (PLCP) packet data unit (PPDU) including one or more Medium Access Control (MAC) Protocol Data Units (MPDUs) to be sent in response to the soliciting frame, determining whether to include one or more control parameters of the plurality of control parameters in at least one of the MPDUs, and transmitting the PPDU to the second station.

76 Claims, 13 Drawing Sheets

(56) References Cited

U.S. PATENT DOCUMENTS

| | | | |
|---|---|---|---|
| 2015/0009910 A1* | 1/2015 | Ryu | H04W 72/04 |
| | | | 370/329 |
| 2016/0029403 A1* | 1/2016 | Roy | H04W 72/0406 |
| | | | 370/336 |
| 2016/0142122 A1* | 5/2016 | Merlin | H04B 7/0617 |
| | | | 375/267 |
| 2016/0226635 A1* | 8/2016 | Chu | H04L 5/003 |
| 2016/0315782 A1* | 10/2016 | Li | H04L 12/1863 |
| 2017/0099219 A1* | 4/2017 | Lee | H04L 69/22 |
| 2017/0149523 A1* | 5/2017 | Li | H04B 7/0452 |

OTHER PUBLICATIONS

Stacey (Intel Corp), "IEEE P802.11—Wireless LANs—Specification Framework for TGax," IEEE Draft, May 26, 2016, 61 pgs., doc: IEEE 802.11-15/0132r15, vol. 802.11 ax, No. 17, XP068106633, Institute of Electrical and Electronics Engineers, Piscataway, NJ USA.

Verma et al. (Qualcomm), "IEEE P802.11—Wireless LANs—Comment Resolutions on Clause 26.3.12.4," IEEE Draft, May 27, 2016, 5 pgs., doc: IEEE 802.11-16/0775r0, XP068106765, Institute of Electrical and Electronics Engineers, Piscataway, NJ USA.

* cited by examiner

… (1)

TECHNIQUES FOR SIGNALING A TRANSMIT POWER HEADROOM IN A CONTROL FIELD

CROSS REFERENCES

The present Application for Patent claims priority to U.S. Provisional Patent Application No. 62/360,302 by Asterjadhi, et al., entitled "TECHNIQUES FOR SIGNALING A TRANSMIT POWER HEADROOM IN A CONTROL FIELD," filed Jul. 8, 2016, and to U.S. Provisional Patent Application No. 62/466,341 by Asterjadhi, et al., entitled "TECHNIQUES FOR SIGNALING A TRANSMIT POWER HEADROOM IN A CONTROL FIELD", filed Mar. 2, 2017, assigned to the assignee hereof.

BACKGROUND

Field of the Disclosure

The present disclosure, for example, relates to wireless communication, and more particularly to techniques for signaling a transmit power headroom in a control field.

Description of Related Art

Wireless communication systems are widely deployed to provide various types of communication content such as voice, video, packet data, messaging, broadcast, and so on. These systems may be multiple-access systems capable of supporting communication with multiple users by sharing the available system resources (e.g., time, frequency, and power). A wireless network, for example a wireless local area network (WLAN) such as a wireless fidelity (Wi-Fi) (i.e., IEEE 802.11) network, may include a wireless host that may communicate with a number of wireless stations or mobile devices. The wireless host (e.g., a wireless station such as an access point (AP) station, a soft AP station, or a small cell) may be coupled to a network, such as the Internet, and may enable a wireless station (STA) to communicate via the network (or enable a STA to communicate with other devices or wireless stations coupled to the wireless host). A wireless station may communicate with a wireless host bi-directionally. For example, in a WLAN, a wireless station may communicate with an associated wireless host via a downlink (DL) and an uplink (UL). The DL (or forward link) may be a communication link that carries communications from the wireless host to the wireless station, and the UL (or reverse link) may be a communication link that carries communications from the wireless station to the wireless host.

When communicating with a wireless station, a wireless host may determine parameters of the communications between the wireless host and the wireless station. These parameters may include, for example, a modulation and coding scheme (MCS) for a downlink and/or an uplink.

SUMMARY

A wireless host's selection of parameters for communicating with a wireless station on an uplink (e.g., an MCS) may be aided by a wireless station's transmission of a transmit power headroom to the wireless host. In some examples, a wireless station may transmit an indication of its transmit power headroom in a control field of a WLAN frame, which control field may additionally or alternatively carry transmit parameters or receive parameters that have changed. In some examples, the wireless station may transmit (or not transmit) the transmit power headroom based on the values of transmit parameters included a same or different subfield of a control field in which the transmit power headroom is transmitted. In some examples, a wireless host may consider a received transmit power headroom valid or invalid based on the values of transmit parameters received in a same or different subfield of a control field in which the transmit power headroom is received.

In one example, a method for wireless communication at a station is described. The method may include identifying a plurality of control parameters including at least one transmit power parameter of the station and at least one of: a buffer status report (BSR) of the station, or at least one transmit parameter of the station, or at least one receive parameter of the station, or channel quality information (CQI), or at least one link parameter, or a combination thereof. The at least one transmit power parameter may include a transmit power headroom of the station. The method may also include transmitting, in a control field carried in one or more wireless local area network (WLAN) frames included in a physical layer convergence protocol (PLCP) packet data unit (PPDU) sent in response to a soliciting frame received from a second station, first information identifying the at least one transmit power parameter.

In one example, a device for wireless communication at a station is described. The device may include a parameter manager to identify a plurality of control parameters including at least one transmit power parameter of the station and at least one of: a BSR of the station, or at least one transmit parameter of the station, or at least one receive parameter of the station, or CQI, or at least one link parameter, or a combination thereof. The at least one transmit power parameter may include a transmit power headroom of the station. The device may also include a WLAN frame manager to transmit, in a control field carried in one or more WLAN frames included in a PPDU sent in response to a soliciting frame received from a second station, first information identifying the at least one transmit power parameter.

In one example, another device for wireless communication at a station is described. The device may include means for identifying a plurality of control parameters including at least one transmit power parameter of the station and at least one of: a BSR of the station, or at least one transmit parameter of the station, or at least one receive parameter of the station, or CQI, or at least one link parameter, or a combination thereof. The at least one transmit power parameter may include a transmit power headroom of the station. The device may also include means for transmitting, in a control field carried in one or more WLAN frames included in a PPDU sent in response to a soliciting frame received from a second station, first information identifying the at least one transmit power parameter.

In one example, a non-transitory computer-readable medium storing computer-executable code for wireless communication at a station is described. The code may be executable by a processor to identify a plurality of control parameters including at least one transmit power parameter of the station and at least one of: a BSR of the station, or at least one transmit parameter of the station, or at least one receive parameter of the station, or CQI, or at least one link parameter, or a combination thereof. The at least one transmit power parameter may include a transmit power headroom of the station. The code may also be executable by the processor to transmit, in a control field carried in one or more WLAN frames included in a PPDU sent in response to a soliciting frame received from a second station, first information identifying the at least one transmit power parameter.

In some examples of the method, devices, and computer-readable medium described above, the PPDU may be sent with at least one other PPDU of at least one other station in a trigger-based PPDU format solicited by the second station or another station. In some examples, each PPDU of the PPDU and the at least one other PPDU may be sent on resources that are orthogonal in at least one of: frequency, or space, or time, or a combination thereof.

Some examples of the method, devices, and computer-readable medium described above may further include processes, features, means, or code to determine whether an allocation of resources for the station to transmit the PPDU sent in response to the soliciting frame includes enough resources to transmit at least one WLAN frame in the PPDU, or the control field, or a combination thereof, and the allocation of resources may be indicated in the soliciting frame, and the first information identifying the at least one transmit power parameter may be transmitted based at least in part on the determination. In some examples, the allocation of resources may be indicated by one or more parameters including at least one of: a duration of transmission, or at least one frequency resource, or a spatial stream allocation, or a modulation and coding scheme (MCS), or a combination thereof Some examples of the method, devices, and computer-readable medium described above may further include processes, features, means, or code to determine a prioritization of the control parameters in the plurality of control parameters, and the first information identifying the at least one transmit power parameter may be transmitted based at least in part on the determination. In some examples, determining the prioritization of the control parameters may include prioritizing the control parameters at the station. In some examples, determining the prioritization of the control parameters may include receiving, from the second station, at least one of the prioritization or a request to transmit the first information identifying the at least one transmit power parameter.

Some examples of the method, devices, and computer-readable medium described above may further include processes, features, means, or code to transmit, in the control field, second information identifying at least one of: the BSR, or the at least one transmit parameter of the station, or the at least one receive parameter of the station, or the CQI, or the at least one link parameter, or a combination thereof. In some examples, the first information and at least part of the second information may be transmitted in a same control information subfield of the control field. In some examples, the first information may be transmitted in a first control information subfield of the control field, and at least part of the second information may be transmitted in a second control information subfield of the control field. In some examples, a change in the at least one transmit parameter of the station may be identified, and the second information may include at least one of: a first indication of whether an uplink multi-user mode is disabled at the station, or a second indication of a maximum number of transmit spatial streams usable for WLAN communication at the station, or a combination thereof. In some examples, the first information may include an indication of whether a minimum transmit power of a current MCS of a trigger-based PPDU is reached at the station. In some examples, the first information may include an indication of a difference between a maximum transmit power of the station and a transmit power used by the station for a WLAN frame. In some examples, the second information may include an indication of whether a maximum transmit power of the station will fluctuate following transmission of a trigger-based PPDU.

Some examples of the method, devices, and computer-readable medium described above may further include processes, features, means, or code to transmit, in a control identification subfield of the control field carried in the one or more WLAN frames, an indication that the control field is configured in at least one mode selected from: a first mode in which the station expects to be solicited for a trigger-based PPDU that carries an immediate acknowledgement, or a second mode in which the station identifies the at least one transmit parameter of the station, or a third mode in which the station identifies the at least one receive parameter of the station, or a fourth mode in which the station identifies the at least one transmit power parameter of the station, or a combination thereof. Some examples of the method, devices, and computer-readable medium described above may further include processes, features, means, or code to determine that the transmit power headroom has priority for inclusion in the one or more WLAN frames when the one or more WLAN frames are carried in a trigger-based PPDU sent as a response to the soliciting frame.

In one example, a method for wireless communication at a first station is described. The method may include receiving, in a control field carried in one or more WLAN frames included in a PPDU received from a second station in response to a soliciting frame transmitted by the first station, at least one of: first information identifying at least one transmit power parameter of a second station, or second information identifying at least one of: a BSR of the second station, or at least one transmit parameter of the second station, or at least one receive power parameter of the second station, or CQI, or at least one link parameter, or a combination thereof. The at least one transmit power parameter may include a transmit power headroom of the second station. The method may also include identifying at least one of: the at least one transmit power parameter of the second station, or the BSR of the second station, or the at least one transmit parameter of the second station, or the at least one receive parameter of the second station, or the CQI, or the at least one link parameter, or a combination thereof.

In one example, a device for wireless communication at a first station is described. The device may include a WLAN frame processor to receive, in a control field carried in one or more WLAN frames included in a PPDU received from a second station in response to a soliciting frame transmitted by the first station, at least one of: first information identifying at least one transmit power parameter of a second station, or second information identifying at least one of: a BSR of the second station, or at least one transmit parameter of the second station, or at least one receive power parameter of the second station, or CQI, or at least one link parameter, or a combination thereof. The at least one transmit power parameter may include a transmit power headroom of the second station. The device may also include a parameter processor to identify at least one of: the at least one transmit power parameter of the second station, or the BSR of the second station, or the at least one transmit parameter of the second station, or the at least one receive parameter of the second station, or the CQI, or the at least one link parameter, or a combination thereof.

In one example, another device for wireless communication at a first station is described. The device may include means for receiving, in a control field carried in one or more WLAN frames included in a PPDU received from a second station in response to a soliciting frame transmitted by the first station, at least one of: first information identifying at least one transmit power parameter of a second station, or second information identifying at least one of: a BSR of the second station, or at least one transmit parameter of the second station, or at least one receive power parameter of the second station, or CQI, or at least one link parameter, or a combination thereof. The at least one transmit power parameter may include a transmit power headroom of the second station. The device may also include means for identifying at least one of: the at least one transmit power parameter of the second station, or the BSR of the second station, or the at least one transmit parameter of the second station, or the at least one receive parameter of the second station, or the CQI, or the at least one link parameter, or a combination thereof.

In one example, a non-transitory computer-readable medium storing computer-executable code for wireless communication at a first station is described. The code may be executable by a processor to receive, in a control field carried in one or more WLAN frames included in a PPDU received from a second station in response to a soliciting frame transmitted by the first station, at least one of: first information identifying at least one transmit power parameter of a second station, or second information identifying at least one of: a BSR of the second station, or at least one transmit parameter of the second station, or at least one receive power parameter of the second station, or CQI, or at least one link parameter, or a combination thereof. The at least one transmit power parameter may include a transmit power headroom of the second station. The code may also be executable by the processor to identify at least one of: the at least one transmit power parameter of the second station, or the BSR of the second station, or the at least one transmit parameter of the second station, or the at least one receive parameter of the second station, or the CQI, or the at least one link parameter, or a combination thereof.

In some examples of the method, devices, and computer-readable medium described above, the first information and at least part of the second information may be received in a same control information subfield of the control field.

In some examples of the method, devices, and computer-readable medium described above, the first information may be received in a first control information subfield of the control field, and at least part of the second information may be received in a second control information subfield of the control field.

In some examples of the method, devices, and computer-readable medium described above, the second information may be received and may include at least one of: a first indication of whether an uplink multi-user mode is disabled at the second station, or a second indication of a maximum number of transmit spatial streams usable for WLAN communication at the second station, or a combination thereof. Some examples of the method, devices, and computer-readable medium described above may further include processes, features, means, or code to determine from the first indication that the uplink multi-user mode is disabled at the second station, and to interpret the first information as invalid.

In some examples of the method, devices, and computer-readable medium described above, the first information may be received and may include a first indication of the transmit power headroom at the second station, and the at least one transmit power parameter of the second station may be identified from the first information. In some examples, the first information may include a second indication of whether a minimum transmit power of a current MCS of a trigger-based PPDU is reached at the second station. In some examples, the first indication of the transmit power headroom may include an indication of a difference between a maximum transmit power of the second station and a transmit power used by the second station for a WLAN frame. In some examples, the second information may be received and may include a second indication of whether a maximum transmit power of the second station will fluctuate following receipt of a trigger-based PPDU by the first station.

Some examples of the method, devices, and computer-readable medium described above may further include processes, features, means, or code to receive, in a control identification subfield of the control field carried in the one or more WLAN frames, an indication that the control field is configured in at least one mode selected from: a first mode in which the second station expects to be solicited for a trigger-based PPDU that carries an immediate acknowledgement, or a second mode in which the second station identifies the at least one transmit parameter of the second station, or a third mode in which the second station identifies the at least one receive parameter of the second station, or a fourth mode in which the second station identifies the at least one transmit power parameter of the second station, or a combination thereof.

The foregoing has outlined rather broadly the features and technical advantages of examples according to the disclosure in order that the detailed description that follows may be better understood. Additional features and advantages will be described hereinafter. The conception and specific examples disclosed may be readily utilized as a basis for modifying or designing other structures for carrying out the same purposes of the present disclosure. Such equivalent constructions do not depart from the scope of the appended claims. Characteristics of the concepts disclosed herein, both their organization and method of operation, together with associated advantages will be better understood from the following description when considered in connection with the accompanying figures. Each of the figures is provided for the purpose of illustration and description only, and not as a definition of the limits of the claims.

BRIEF DESCRIPTION OF THE DRAWINGS

Aspects of the disclosure are described in reference to the following figures.

DETAILED DESCRIPTION

In a WLAN, wireless hosts (e.g., stations such as AP stations, soft APs, or small cells) may send soliciting frames (e.g., trigger frames) to one or more wireless stations (other stations). A wireless station that receives a trigger frame may respond to the wireless host, within a short inter-frame spacing (SIFS) time, with a packet sent in accordance with an uplink (UL) multi-user (MU) mode. A trigger frame may indicate parameters (e.g., an MCS, resource units, a number of spatial streams (Nss), a duration, etc.) that a wireless station uses to transmit its portion of a MU packet. An MU packet includes transmissions from multiple users (i.e., stations), which transmissions are multiplexed in frequency, space, and time.

Techniques described in the present disclosure enable a wireless station to transmit, to a wireless host, parameters that may be useful in selecting the parameters that the wireless station uses to transmit its portion of a MU packet. The parameters that the wireless station may transmit to the wireless host may include, for example, an indication of whether the wireless host wants to participate in UL MU transmissions, and if so, a maximum number of spatial streams that the wireless host will use for UL MU transmissions and/or a transmit power headroom of the wireless station.

Aspects of the disclosure are initially described in the context of a wireless communication system. Specific examples are then described for operation of a wireless station (e.g., a station) and a wireless host (e.g., an AP station), and devices that may be included in a wireless station or wireless host. These and other aspects of the disclosure are additionally or alternatively illustrated by and described with reference to apparatus diagrams, system diagrams, process flows, and flowcharts that relate to transmitting a WLAN frame between stations.

Figure 1:
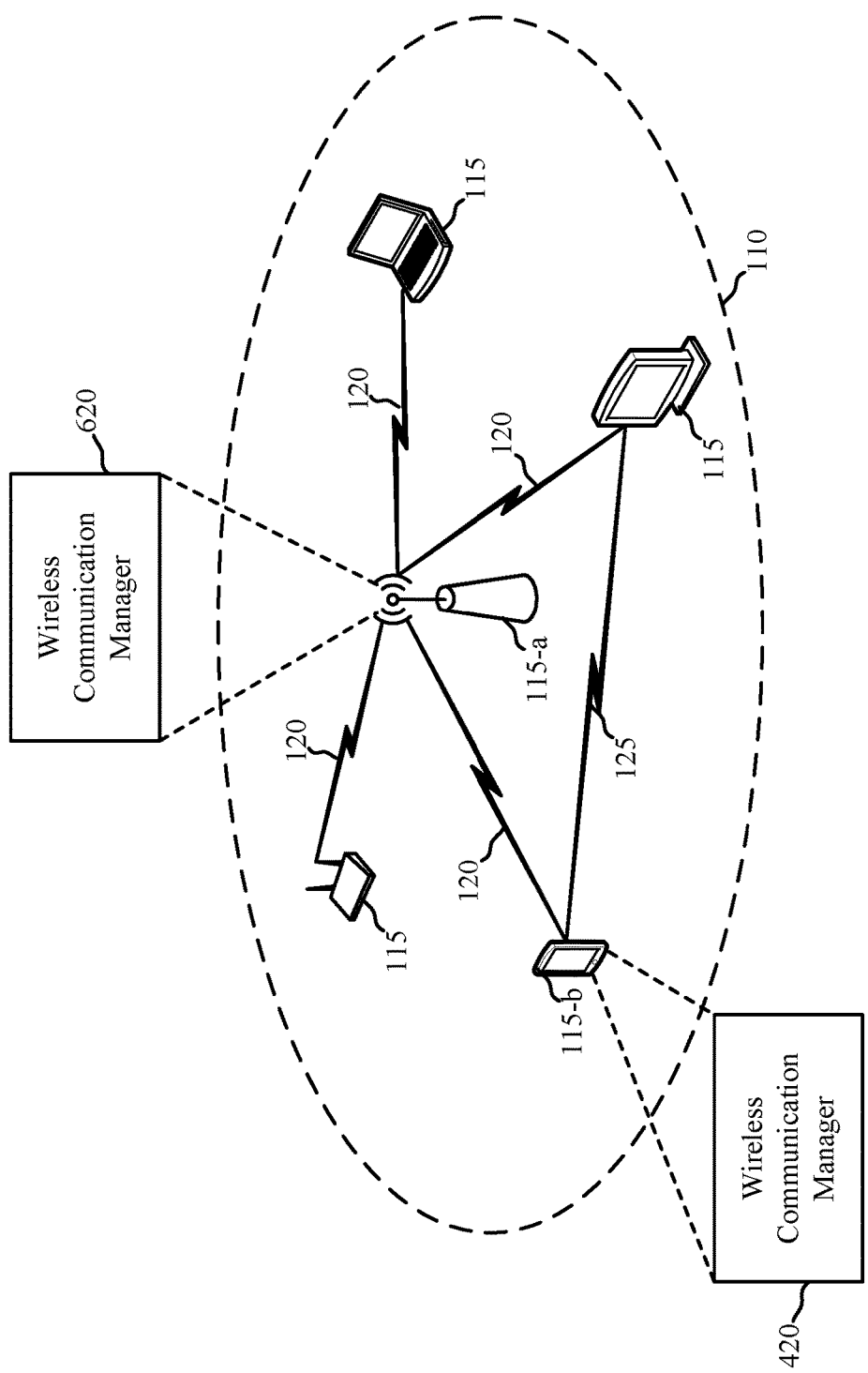
FIG. 1 illustrates a WLAN (also known as a wireless fidelity (Wi-Fi) network), in accordance with various aspects of the present disclosure.

FIG. 1 illustrates a WLAN 100 (also known as a wireless fidelity (Wi-Fi) network), in accordance with various aspects of the present disclosure. The WLAN 100 may include a wireless host 115-a (e.g., a wireless station (STA) such as an AP station, a soft AP station, or a small cell) and multiple associated STAs 115. The wireless stations 115 may represent devices such as mobile stations, personal digital assistant (PDAs), other handheld devices, netbook computers, notebook computers, tablet computers, laptop computers, display devices (e.g., TVs, computer monitors, etc.), printers, gaming consoles, Internet of Things (IoT) devices, etc. The wireless host 115-a and associated wireless stations 115 may represent a Basic Service Set (BSS) or an Extended Service Set (ESS). The various wireless stations 115 in the network may communicate with one another, or with a wireless wide area network (WWAN; e.g., the internet or a cellular network) through the wireless host 115-a. Also shown is a coverage area 110 of the wireless host 115-a, which may represent a Basic Service Area (BSA) of the WLAN 100. An extended network station (not shown) associated with the WLAN 100 may be connected to a wired or wireless distribution system (DS) that may allow multiple wireless hosts 115-a to be connected in an ESS.

Although not shown in FIG. 1, a wireless station 115 may be located in the intersection of more than one coverage area 110 and may associate with more than one wireless host 115-a. A single wireless host 115-a and associated set of wireless stations 115 may be referred to as a BSS. An ESS is a set of connected BSSs. A distribution system (DS) (not shown) may be used to connect wireless hosts 115-a in an ESS. In some cases, the coverage area 110 of a wireless host 115-a may be divided into sectors (also not shown). The WLAN 100 may include wireless hosts 115-a of different types (e.g., metropolitan area, home network, etc.), with varying and overlapping coverage areas 110. Two wireless stations 115 may communicate indirectly, via a wireless host 115-a, or directly via a direct wireless link 125, regardless of whether both wireless stations 115 are in the same coverage area 110. Examples of direct wireless links 125 may include Wi-Fi Direct connections, Wi-Fi Tunneled Direct Link Setup (TDLS) links, and other group connections. Wireless stations 115 and wireless hosts 115-a may communicate according to the WLAN radio and baseband protocol for physical (PHY) and medium access control (MAC) layers from IEEE 802.11 and versions including, but not limited to, 802.11b, 802.11g, 802.11a, 802.11n, 802.11ac, 802.11ad, 802.11ah, etc. In other implementations, peer-to-peer connections or ad hoc networks may be implemented within the WLAN 100.

A wireless host 115-a may periodically transmit a frame known as a beacon frame. A beacon frame may contain information related to the WLAN. For example, a beacon frame may contain a timestamp for synchronization, an interval indicating the periodicity of the beacon frame (and thus the target beacon transmission time (TBTT)), information related to the capabilities of the network, a service set identifier (SSID), supported rates, frequency hopping parameters, direct-sequence parameters, contention-free access parameters, independent BSS (IBSS) parameters, and/or a traffic indication map (TIM). A TIM may indicate to a client wireless station 115 whether a wireless host 115-a has buffered frames waiting for the wireless station 115. In some cases, a beacon frame may additionally or alternatively contain a delivery traffic indication message (DTIM), which may inform client wireless stations 115 about pending broadcast or multicast transmissions. After a TIM or a DTIM, a wireless host 115-a may transmit the indicated data using carrier sense multiple access with collision avoidance (CSMA/CA). In some cases, wireless stations 115 may enter a sleep mode between beacon frame transmissions to conserve power.

A wireless host 115-a may include a wireless communication manager 620 that may be used, in some examples, to receive, in a control field carried in one or more WLAN frames included in a PPDU received from a wireless station 115 in response to a soliciting frame transmitted by the wireless host 115-a, at least one of: first information identifying at least one transmit power parameter of the wireless station 115, or second information identifying at least one of: a BSR of the wireless station 115, or at least one transmit parameter of the wireless station 115, or at least one receive power parameter of the wireless station 115, or CQI, or at least one link parameter, or a combination thereof. The at least one transmit power parameter may include a transmit power headroom of the wireless station 115. The wireless communication manager 620 may also be used by the wireless host 115-a to identify at least one of: the at least one transmit power parameter of the wireless station 115, or the BSR of the wireless station 115, or the at least one transmit parameter of the wireless station 115, or the at least one receive parameter of the wireless station 115, or the CQI, or the at least one link parameter, or a combination thereof.

A wireless station 115-b may include a wireless communication manager 420 that may be used, in some examples, to identify a plurality of control parameters including at least one transmit power parameter of the wireless station 115-b and at least one of: a BSR of the wireless station 115-b, or at least one transmit parameter of the wireless station 115-b, or at least one receive parameter of the wireless station 115-b, or CQI, or at least one link parameter, or a combination thereof. The at least one transmit power parameter may include a transmit power headroom of the wireless station 115-b. The wireless communication manager 420 may also be used by the wireless station 115-b to transmit, in a control field carried in one or more WLAN frames included in a PPDU sent in response to a soliciting frame received from a wireless host 115, first information identifying the at least one transmit power parameter.

Figure 2:
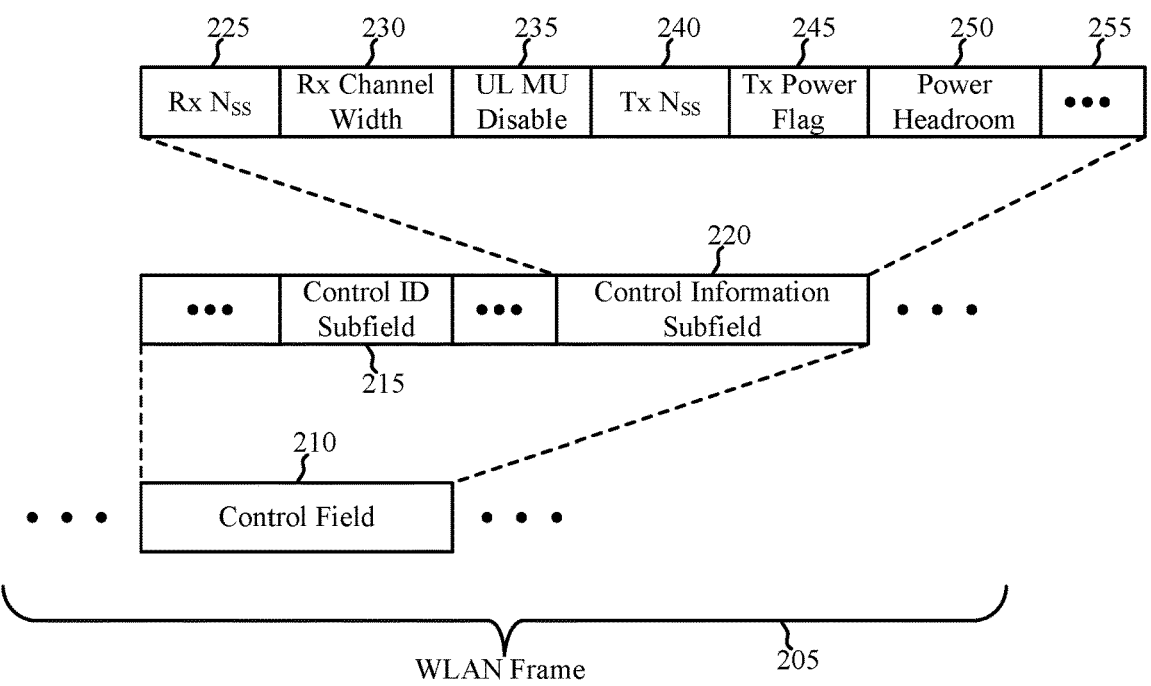
FIG. 2 shows an example of a WLAN frame that may be transmitted from a transmitting station to a receiving station, in accordance with various aspects of the present disclosure.

FIG. 2 shows an example of a WLAN frame 205 (e.g., a Medium Access Control (MAC) Protocol Data Unit (MPDU)) that may be transmitted from a transmitting station to a receiving station, in accordance with various aspects of the present disclosure. The transmitting station may be one of the stations (e.g., wireless host 115-a or wireless station 115-b) described with reference to FIG. 1, and the receiving station may be another one of the stations described with reference to FIG. 1. The WLAN frame 205 may be transmitted by a non-AP station or an AP station.

As shown, the WLAN frame 205 includes a control field 210. The control field 210 may be a High Efficiency (HE) control field, and in some cases may be one of a plurality of control fields included in an HE Aggregated (A)-control field. The control field 210 includes a plurality of subfields, including a control identification (ID) subfield 215 and an optional control information subfield 220. The control ID subfield 215 indicates a mode in which the control field 210 is configured. For example, the control ID subfield 215 may carry a first value (e.g., "1") indicating that the control information subfield 220 is being transmitted in the control field 210 of the WLAN frame 205, or a second value (e.g., "0") indicating that the control information subfield 220 is not being transmitted in the control field 210 of the WLAN frame 205. In some examples, the control information subfield 220 may be transmitted to signal an operating mode change of the transmitting station (i.e., the station transmitting the WLAN frame), and may not be transmitted when the transmitting station does not have an operating mode change to signal.

When the control information subfield 220 is transmitted in the control field 210 of the WLAN frame 205, the control information subfield 220 has a format that includes a plurality of additional subfields. The plurality of additional subfields include a Receive (Rx) $N_{SS}$ subfield 225 (e.g., a 3 bit subfield), a Rx Channel Width subfield 230 (e.g., a 2 bit subfield), a UL MU Disable subfield 235 (e.g., a 1 bit subfield), a Transmit (Tx) $N_{SS}$ subfield 240 (e.g., a 3 bit subfield), a Tx Power Flag subfield 245 (e.g., a 1 bit subfield), a Power Headroom subfield 250 (e.g., a 5 bit subfield), and optionally, a number of reserved bits 255. The Rx $N_{SS}$ subfield 225 and Rx Channel Width subfield 230 are used by the transmitting station to transmit information identifying a change in at least one receive parameter of the transmitting station. The UL MU Disable subfield 235 and Tx $N_{SS}$ subfield 240 are used by the transmitting station to transmit information identifying a change in at least one transmit parameter of the transmitting station. The Tx Power Flag subfield 245 and Power Headroom subfield 250 are used to transmit information identifying at least one transmit power parameter of the transmitting station.

The Rx $N_{SS}$ subfield 225 indicates the maximum number of spatial streams, $N_{SS}$, that the transmitting station can receive, and is set to a value of $N_{SS}-1$.

The Rx Channel Width subfield 230 indicates an operating channel width supported by the transmitting station when operating in a receive mode, and is set to 0 for 20 MHz, 1 for 40 MHz, 2 for 80 MHz, and 3 for 160 MHz (e.g., 80 MHz+80 MHz).

When the transmitting station is a non-AP station, the UL MU Disable subfield 235 indicates whether UL MU operation is suspended or resumed by the transmitting station. The UL MU Disable subfield 235 is set to 1 to indicate that UL MU operation is suspended, and is otherwise set to 0 to indicate that UL MU operation is resumed. When the transmitting station is an AP station, the UL MU Disable subfield 235 is set to 0.

The Tx $N_{SS}$ subfield 240 indicates a maximum number of spatial streams, $N_{SS}$, that the transmitting station can receive, and is set to a value of $N_{SS}-1$.

When the transmitting station is a non-AP station, the Tx Power Flag subfield 245 indicates whether there are transmit power limitations or fluctuations at the transmitting station. The Tx Power Flag subfield 245 is set to 1 to indicate that the minimum transmit power of the current modulation and coding scheme (MCS) of a current trigger-based physical layer convergence protocol (PLCP) packet data unit (PPDU) is reached at the transmitting station, or to indicate that a maximum transmit power of the transmitting station will fluctuate following transmission of a current non-trigger-based PPDU, and is otherwise set to 0.

The Power Headroom subfield 250 indicates an available transmit power headroom ($HR_{STA}$), in units of dB, with respect to transmission of the current WLAN frame 205. The transmit power headroom may be calculated as $HR_{STA}=TX_{pwr}^{MAX}-TX_{pwr}^{STA}$, where $TX_{pwr}^{MAX}$ is the potential transmit power that can be reached by the transmitting station when the target received signal strength indication (RSSI) value is 127 (i.e., $TX_{pwr}^{MAX}$ is the maximum transmit power for the current MCS and PPDU), and $TX_{pwr}^{STA}$ is the transmit power used by the STA to transmit a PPDU in the current WLAN frame 205.

When the transmitting station is a non-AP station, the transmitting station may indicate a change in at least one transmit parameter of the transmitting station in various ways. The transmitting station may set the UL MU Disable subfield 235 to 1 to indicate a suspension of UL MU operation at the transmitting station; otherwise, the UL MU Disable subfield 235 is set to 0 to indicate resumption of, or no changes to, UL MU operation at the transmitting station. The transmitting station may set the Tx $N_{SS}$ subfield 240 to indicate a maximum number of spatial streams, $N_{SS}$, that the transmitting station will use in response to trigger frames.

The transmitting station may set the TX Power Flag subfield 245 to 1 to indicate that the maximum transmit power of the transmitting station will fluctuate following transmission of a current non-trigger-based PPDU, and may otherwise set the Tx Power Flag subfield 245 to 0. The transmitting station may additionally or alternatively set the Tx Power Flag subfield 245 to 1 when the control field 210 is carried in an HE A-control field of a current trigger-based PPDU, to indicate that the minimum transmit power of the current MCS is reached at the transmitting station. The transmitting station may set the Power Headroom subfield 250 to indicate the available transmit power headroom with respect to transmission of the current WLAN frame 205.

A receiving station that successfully receives the WLAN frame 205, including the control information subfield 220, may consider the transmitting station as not participating in UL MU operation for subsequent transmission opportunities (TxOPs) when the UL MU Disable subfield 235 is set to 1, and may consider the values in the Tx $N_{SS}$ subfield 240 and the Power Headroom subfield 250 as invalid when the UL MU Disable subfield 235 is set to 1. The receiving station may consider the transmitting station as participating in UL MU operation for subsequent TxOPs when the UL MU Disable subfield 235 is set to 0, and may consider the maximum number of spatial streams on which the transmitting station can transmit to be equal to the value in the Tx $N_{SS}$ subfield 240 when the UL MU Disable subfield is set to 0. The receiving station may consider the transmitting station to have transmit power fluctuations for subsequent TxOPs when the Tx Power Flag subfield 245 is set to 1 and the control field 210 is carried in a non-trigger-based PPDU, and may consider the transmitting station to have reached a minimum transmit power of the current MCS when the Tx Power Flag subfield is set to 1 and the control field 210 is carried in a trigger-based PPDU. When both the UL MU Disable subfield 235 and the Tx Power Flag subfield are set to 0 and the control field 210 is carried in a non-trigger-based PPDU, the receiving station may consider the transmit power headroom indicated in the Power Headroom subfield 250 when selecting an MCS for the transmitting station. When the UL MU Disable subfield 235 is set to 0 and the control field 210 is carried in a trigger-based PPDU, the receiving station may consider the transmit power headroom indicated in the Power Headroom subfield 250 when selecting an MCS for the transmitting station.

Figure 3:
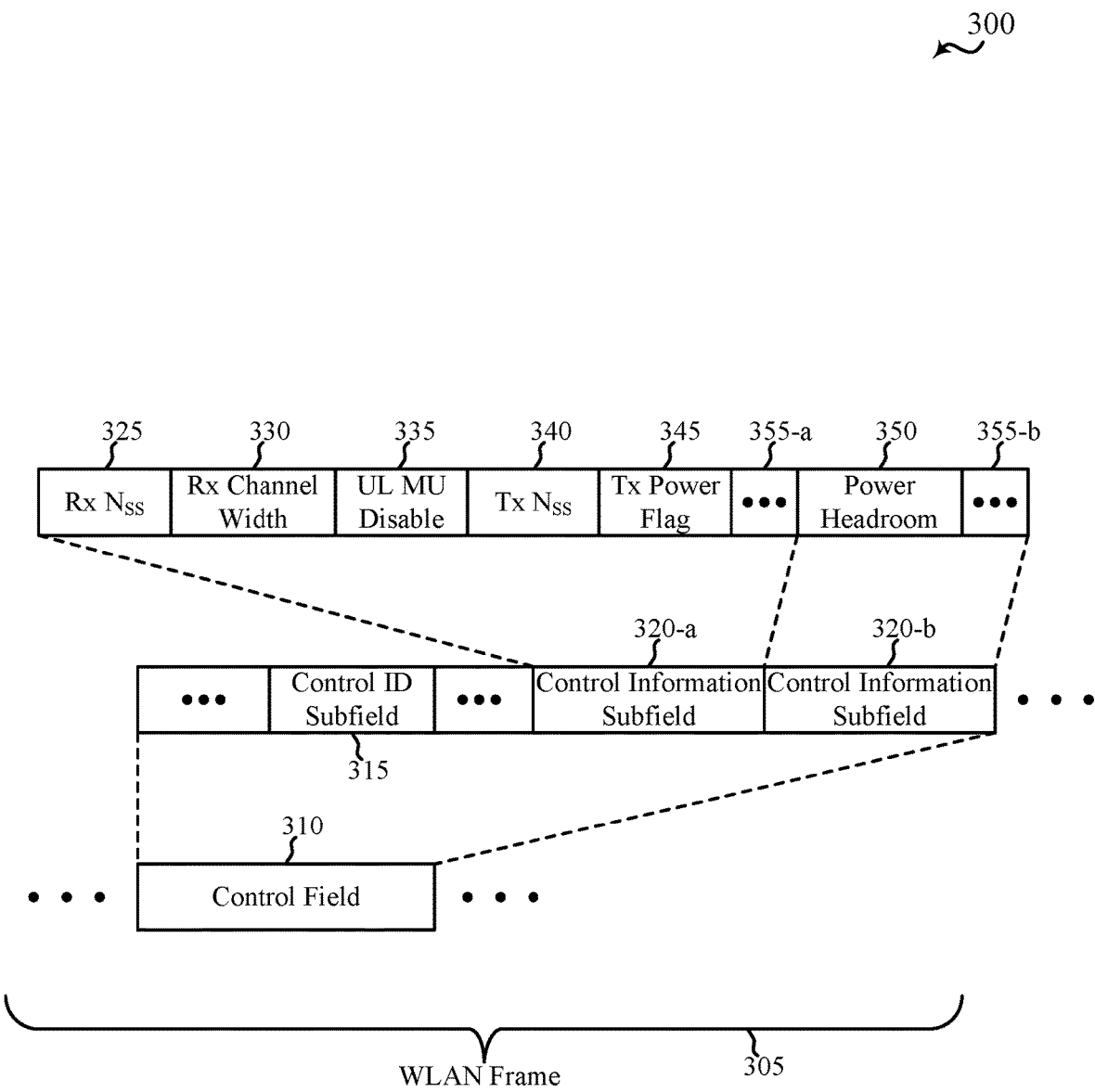
FIG. 3 shows an example of a WLAN frame that may be transmitted from a transmitting station to a receiving station, in accordance with various aspects of the present disclosure.

FIG. 3 shows an example of a WLAN frame 305 (e.g., an MPDU) that may be transmitted from a transmitting station to a receiving station, in accordance with various aspects of the present disclosure. The transmitting station may be one of the stations (e.g., wireless host 115-*a* or wireless station 115-*b*) described with reference to FIG. 1, and the receiving station may be another one of the stations described with reference to FIG. 1. The WLAN frame 305 may be transmitted by a non-AP station or an AP station.

As shown, the WLAN frame 305 includes a control field 310. The control field 310 may be an HE control field, and in some cases may be one of a plurality of control fields included in an HE A-control field. The control field 310 includes a plurality of subfields, including a control ID subfield 315, an optional first control information subfield 320-*a*, and an optional second control information subfield 320-*b*. The control ID subfield 315 indicates at least one mode in which the control field 310 is configured. For example, the control ID subfield 315 may carry a first value (e.g., "0") indicating that the control field 310 is configured in a first mode in which the transmitting station expects an UL MU PPDU that carries an immediate acknowledgement, a second value (e.g., "1") indicating that the control field 310 is configured in a second mode in which the transmitting station identifies a change in a receive parameter of the transmitting station (and transmits the first control information subfield 320-*a* in the control field 310 of the WLAN frame 305), a third value (e.g., "2") indicating that the control field 310 is configured in a third mode in which the transmitting station identifies a change in a transmit parameter of the transmitting station (and follows a HE link adaptation procedure and transmits the first control information subfield 320-*a* in the control field 310 of the WLAN frame 305), and/or a fourth value (e.g., "4") indicating that the control field 310 is configured in a fourth mode in which the transmitting station identifies a transmit power parameter of the transmitting station (and follows an UL MU operation procedure and transmits the second control information subfield 320-*b* in the control field 310 of the WLAN frame 305).

When the first control information subfield 320-*a* is transmitted in the control field 310 of the WLAN frame 305, the first control information subfield 320-*a* has a format that includes a plurality of additional subfields. The plurality of additional subfields include a Rx $N_{SS}$ subfield 325 (e.g., a 3 bit subfield), a Rx Channel Width subfield 330 (e.g., a 2 bit subfield), a UL MU Disable subfield 335 (e.g., a 1 bit subfield), a Tx $N_{SS}$ subfield 340 (e.g., a 3 bit subfield), a Tx Power Flag subfield 345 (e.g., a 1 bit subfield), and optionally, a number of reserved bits 355-*a*. The Rx $N_{SS}$ subfield 325 and Rx Channel Width subfield 330 are used by the transmitting station to transmit information identifying a change in at least one receive parameter of the transmitting station. The UL MU Disable subfield 335 and Tx $N_{SS}$ subfield 340 are used by the transmitting station to transmit information identifying a change in at least one transmit parameter of the transmitting station. The Tx Power Flag subfield 345 is used to transmit information identifying at least one transmit power parameter of the transmitting station.

The Rx $N_{SS}$ subfield 325 indicates the maximum number of spatial streams, $N_{SS}$, that the transmitting station can receive, and is set to a value of $N_{SS}-1$.

The Rx Channel Width subfield 330 indicates an operating channel width supported by the transmitting station when operating in a receive mode, and is set to 0 for 20 MHz, 1 for 40 MHz, 2 for 80 MHz, and 3 for 160 MHz (e.g., 80 MHz+80 MHz).

When the transmitting station is a non-AP station, the UL MU Disable subfield 335 indicates whether UL MU operation is suspended or resumed by the transmitting station. The UL MU Disable subfield 335 is set to 1 to indicate that UL MU operation is suspended, and is otherwise set to 0 to indicate that UL MU operation is resumed. When the transmitting station is an AP station, the UL MU Disable subfield 335 is set to 0.

The Tx $N_{SS}$ subfield 340 indicates a maximum number of spatial streams, $N_{SS}$, that the transmitting station can receive, and is set to a value of $N_{SS}-1$.

When the transmitting station is a non-AP station, the Tx Power Flag subfield 345 indicates whether there are transmit power fluctuations at the transmitting station. The Tx Power Flag subfield 345 is set to 1 to indicate that a maximum transmit power of the transmitting station will fluctuate following transmission of a current non-trigger-based PPDU, and is otherwise set to 0.

When the second control information subfield 320-*b* is transmitted in the control field 310 of the WLAN frame 305, the second control information subfield 320-*b* has a format that includes a Power Headroom subfield 350 (e.g., a 6 bit subfield), and optionally, a number of reserved bits 355-*b*. The Power Headroom subfield 350 is used to transmit information identifying at least one transmit power parameter of the transmitting station. The Power Headroom subfield 350 includes a first portion (e.g., a least significant 5 bits) and a second portion (e.g., a most significant bit). The first portion is used to indicate an available transmit power headroom ($HR_{STA}$), in units of dB, with respect to transmission of the current WLAN frame 305. The transmit power headroom may be calculated as $HR_{STA}=TX_{pwr}^{MAX}-TX_{pwr}^{STA}$, where $TX_{pwr}^{MAX}$ is the potential transmit power that can be reached by the transmitting station when the target RSSI value is 127 (i.e., $TX_{pwr}^{MAX}$ is the maximum transmit power for the current MCS and PPDU), and $TX_{pwr}^{STA}$ is the transmit power used by the STA to transmit a PPDU in the current WLAN frame 305. The second portion is used to indicate whether a minimum transmit power of the current MCS of a current trigger-based PPDU is reached at the transmitting station, and is set to 1 when the minimum transmit power is reached, and otherwise to 0.

When the transmitting station is a non-AP station, the transmitting station may indicate a change in at least one transmit parameter of the transmitting station in various ways. The transmitting station may set the UL MU Disable subfield 335 to 1 to indicate a suspension of UL MU operation at the transmitting station; otherwise, the UL MU Disable subfield 335 is set to 0 to indicate resumption of, or no changes to, UL MU operation at the transmitting station. The transmitting station may set the Tx $N_{SS}$ subfield 340 to indicate a maximum number of spatial streams, $N_{SS}$, that the transmitting station will use in response to trigger frames. The transmitting station may set the TX Power Flag subfield 345 to 1 to indicate that the maximum transmit power of the transmitting station will fluctuate following transmission of a current non-trigger-based PPDU, and may otherwise set the Tx Power Flag subfield 345 to 0. The transmitting station may set the second portion of the Power Headroom subfield 350 to 1 when the control field 310 is carried in an HE A-control field of a current trigger-based PPDU, to indicate that the minimum transmit power of the current MCS is reached at the transmitting station. The transmitting station may set the Power Headroom subfield 350 to indicate the available transmit power headroom with respect to transmission of the current WLAN frame 305.

A receiving station that successfully receives the WLAN frame 305, including the first control information subfield 320-*a*, may consider the transmitting station as not participating in UL MU operation for subsequent TxOPs when the UL MU Disable subfield 335 is set to 1, and may consider the values in the Tx $N_{SS}$ subfield 340 and the Power Headroom subfield 350 as invalid when the UL MU Disable subfield 335 is set to 1. The receiving station may consider the transmitting station as participating in UL MU operation for subsequent TxOPs when the UL MU Disable subfield 335 is set to 0, and may consider the maximum number of spatial streams on which the transmitting station can transmit to be equal to the value in the Tx $N_{SS}$ subfield 340 when the UL MU Disable subfield is set to 0. The receiving station may consider the transmitting station to have transmit power fluctuations for subsequent TxOPs when the Tx Power Flag subfield 345 is set to 1 and the control field 310 is carried in a non-trigger-based PPDU, and may consider the transmitting station to have reached a minimum transmit power of the current MCS when the second portion of the Power Headroom subfield 350 is set to 1 and the control field 310 is carried in a trigger-based PPDU. When both the UL MU Disable subfield 335 and the Tx Power Flag subfield are set to 0 and the control field 310 is carried in a non-trigger-based PPDU, the receiving station may consider the transmit power headroom indicated in the first portion of the Power Headroom subfield 350 (if included in the control field 310 of the WLAN frame 305) when selecting an MCS for the transmitting station. When the UL MU Disable subfield 335 is set to 0 and the control field 310 is carried in a trigger-based PPDU, the receiving station may consider the transmit power headroom indicated in the first portion of the Power Headroom subfield 350 (if included in the control field 310 of the WLAN frame 305) when selecting an MCS for the transmitting station.

In some examples, one or more WLAN frame 205 or WLAN frame 305 may be transmitted in a PPDU (e.g., an Aggregated MPDU (A-MPDU)), which PPDU may be transmitted by a wireless station in response to a soliciting frame received from a wireless host. In some examples, the PPDU may be sent with at least one other PPDU of at least one other wireless station in a trigger-based PPDU format solicited by the wireless host. In some examples, each PPDU of the PPDU transmitted by the wireless station and the at least one other PPDU may be sent on resources that are orthogonal in at least one of: frequency, or space, or time, or a combination thereof.

In some examples, the control field 210 or control field 310 may be included in the WLAN frame 205 or WLAN frame 305 based at least in part on a determination that an allocation of resources for the wireless station to transmit a PPDU in response to a soliciting frame includes enough resources to transmit at least one WLAN frame in the PPDU, or the control field, or a combination thereof. For example, a wireless station may include an HE Control field containing an Uplink Power Headroom (UPH) Control field in MPDUs carried in an A-MPDU of an HE Trigger-based PPDU, unless the remaining space in the A-MPDU, after inclusion of solicited MPDUs that cannot contain an HE Control field, is not sufficient to contain MPDU(s) that contain an HE Control field.

In some examples, the control field 210 or control field 310 may be included in the WLAN frame 205 or WLAN frame 305 based at least in part on a prioritization of control parameters. The prioritization may be determined locally (i.e., at a wireless station) or based at least in part on a prioritization received from a wireless host. For example, a wireless station may include an HE Control field containing a UPH Control field in MPDUs carried in an A-MPDU of an HE Trigger-based PPDU, unless the wireless station includes other Control fields in the HE Control field and the available space in the HE Control field is not sufficient to contain an additional UPH Control field.

Figure 4:
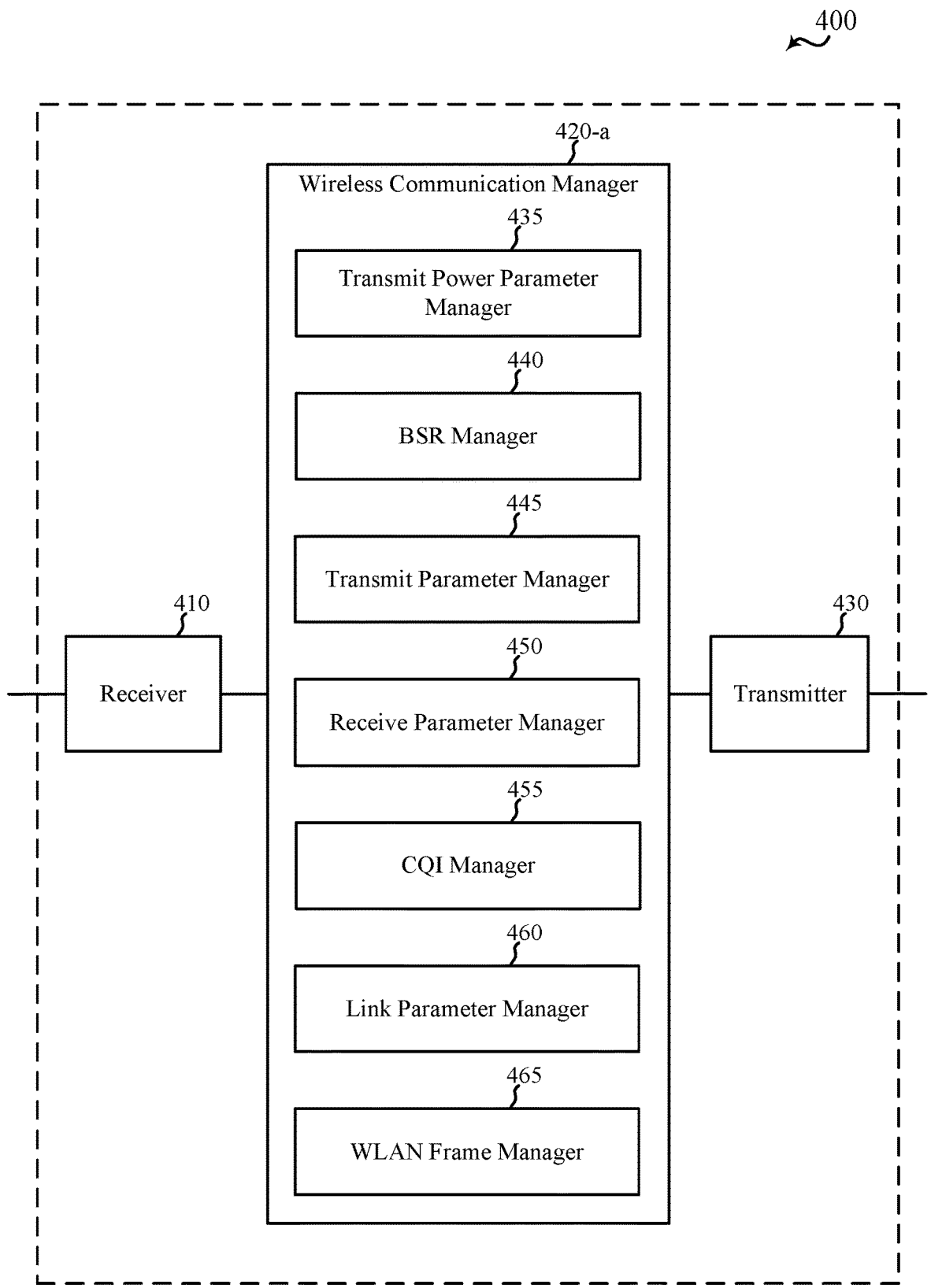
FIG. 4 shows a block diagram of a device used for wireless communication at a station (e.g., a WLAN station), in accordance with various aspects of the present disclosure.

FIG. 4 shows a block diagram of a device 400 used for wireless communication at a station (e.g., a WLAN station), in accordance with various aspects of the present disclosure. The device 400 may be an example of aspects of a station 115 described with reference to FIG. 1. The device 400 may include a receiver 410, a wireless communication manager 420-*a*, and/or a transmitter 430. The device 400 may also include a processor. Each of these components may be in communication with each other.

The receiver 410 may be used to receive information such as packets, user data, or control information associated with various information channels (e.g., control channels, data channels, etc.) and/or frames (e.g., WLAN frames of trigger-based PPDUs, WLAN frames of non-trigger-based PPDUs, etc.). Received information may be passed to the wireless communication manager 420-*a* and/or to other components of the device 400. The receiver 410 may include (or be associated) with one or multiple antennas.

The wireless communication manager 420-*a* may include a transmit power parameter manager 435, a BSR manager 440, a transmit parameter manager 445, a receive parameter manager 450, a CQI manager 455, a link parameter manager 460, and/or a WLAN frame manager 465.

The parameter managers (e.g., the transmit power parameter manager 435, the BSR manger 440, the transmit parameter manager 445, the receive parameter manager 450, the CQI manager 455, and/or the link parameter manager 460) may be used to respectively identify a plurality of control parameters including at least one transmit power parameter of a station including the device 400, and at least one of: a BSR of the station, or at least one transmit parameter of the station (including, in some examples, a change in at least one transmit parameter), or at least one receive parameter of the station (including, in some examples, a change in at least one receive parameter), or a CQI, or at least one link parameter (including, in some examples, a change in at least one link parameter), or a combination thereof, as described with reference to FIGS. 2-3. The at least one transmit power parameter may include a transmit power headroom of the station.

The WLAN frame manager 465 may be used to transmit, in a control field carried in one or more WLAN frames included in a PPDU sent in response to a soliciting frame received from a second station, first information identifying the at least one transmit power parameter. In some examples, the station may additionally or alternatively transmit, in the control field, second information identifying at least one of: the BSR, or the at least one transmit parameter of the station, or the at least one receive parameter of the station, or the CQI, or the at least one link parameter, or a combination thereof, as described with reference to FIGS. 2-3. In some examples, the first information and at least part of the second information may be transmitted in a same control information subfield of the control field, as described with reference to FIG. 2. In some examples, the first information may be transmitted in a first control information subfield of the control field, and the second information may be transmitted in a second control information subfield of the control field (i.e., the first control information subfield and the second control information subfield may be transmitted in the same control field), as described with reference to FIG. 3. In some examples, the PPDU may be sent with at least one other PPDU of at least one other station in a trigger-based PPDU format solicited by the second station or another station. In some examples, each PPDU of the PPDU sent by the station and the at least one other PPDU sent by the at least one other station may be sent on resources that are orthogonal in at least one of: frequency, or space, or time, or a combination thereof.

In some examples, the transmit parameter manager 445 may optionally be used to identify a change in at least one transmit parameter of the station, and the second information may include at least one of: a first indication of whether an uplink multi-user mode is disabled at the station, or a second indication of a maximum number of transmit spatial streams usable for WLAN communication at the station, or a combination thereof. In some of these examples, and when the first indication indicates the uplink multi-user mode is disabled at the station, the WLAN frame manager 465 may refrain from transmitting the at least one transmit power parameter in the control field.

In some examples, the first information may include an indication of whether a minimum transmit power of a current MCS of a trigger-based PPDU is reached at the station including the device 400. In some examples, the first information may additionally or alternatively include an indication of a difference between a maximum transmit power of the station and a transmit power used by the station for a WLAN frame. In some examples, the second information may include an indication of whether a maximum transmit power of the station will fluctuate following transmission of a trigger-based PPDU.

In some examples, the WLAN frame manager 465 may optionally be used to transmit, in a control identification subfield of a control field carried in one or more WLAN frames included in a PPDU sent in response to a soliciting frame received from a second station, an indication that the control field is configured in at least one mode selected from: a first mode in which the station expects to be solicited for a trigger-based PPDU (e.g., an uplink multi-user PPDU) that carries an immediate acknowledgement, or a second mode in which the station identifies the at least one transmit parameter of the station, or a third mode in which the station identifies the at least one receive parameter of the station, or a fourth mode in which the station identifies the at least one transmit power parameter of the station, or a combination thereof. In some examples, the PPDU may be sent with at least one other PPDU of at least one other station in a trigger-based PPDU format solicited by the second station or another station. In some examples, each PPDU of the PPDU sent by the station and the at least one other PPDU sent by the at least one other station may be sent on resources that are orthogonal in at least one of: frequency, or space, or time, or a combination thereof.

In some examples, the WLAN frame manager 465 may optionally be used to determine that the transmit power headroom has priority (e.g., first priority) for inclusion in the one or more WLAN frames when the one or more WLAN frames are carried in a trigger-based PPDU sent as a response to the soliciting frame.

In some examples, the WLAN frame manager 465 may optionally be used to determine whether an allocation of resources indicated in a soliciting frame received from a second station, for the station to transmit a PPDU in response to the soliciting frame, includes enough resources for the station to transmit at least one WLAN frame in the PPDU, or a control field (i.e., a control field that may be carried in the one or more WLAN frames), or a combination thereof. In some examples, the allocation of resources may be indicated by one or more parameters including at least one of: a duration of transmission, or at least one frequency resource, or a spatial stream allocation, or an MCS, or a combination thereof. In some examples, the PPDU may be sent with at least one other PPDU of at least one other station in a trigger-based PPDU format solicited by the second station or another station. In some examples, each PPDU of the PPDU sent by the station and the at least one other PPDU sent by the at least one other station may be sent on resources that are orthogonal in at least one of: frequency, or space, or time, or a combination thereof. In some examples, the WLAN frame manager 465 may transmit the first information in the control field based at least in part on the determination regarding the allocation of resources.

In some examples, the WLAN frame manager 465 may optionally be used to determine a prioritization of the control parameters in the plurality of control parameters. In some examples, determining the prioritization of the control parameters may include prioritizing the control parameters at the station (i.e., determining the prioritization locally). In some examples, determining the prioritization of the control parameters may include receiving the prioritization from a second station (e.g., from an access point). In some examples, determining the prioritization of the control parameters may include receiving, from the second station, a request to transmit the first information identifying the at least one transmit power parameter. The station including the WLAN frame manager 465 may transmit the first information in the control field based at least in part on the determination regarding the prioritization.

The transmitter 430 may be used to transmit information received from other components of the device 400, including information received from the wireless communication manager 420-a. The information may include, for example, packets, user data, or control information associated with various information channels (e.g., control channels, data channels, etc.) and/or frames (e.g., WLAN frames of trigger-based PPDUs, WLAN frames of non-trigger-based PPDUs, etc.). In some examples, the transmitter 430 may be collocated with the receiver 410 in a transceiver. The transmitter 430 may include (or be associated) with one or multiple antennas, which antenna(s) may be the same as, or different from, the antenna(s) used by the receiver 410.

Figure 5:
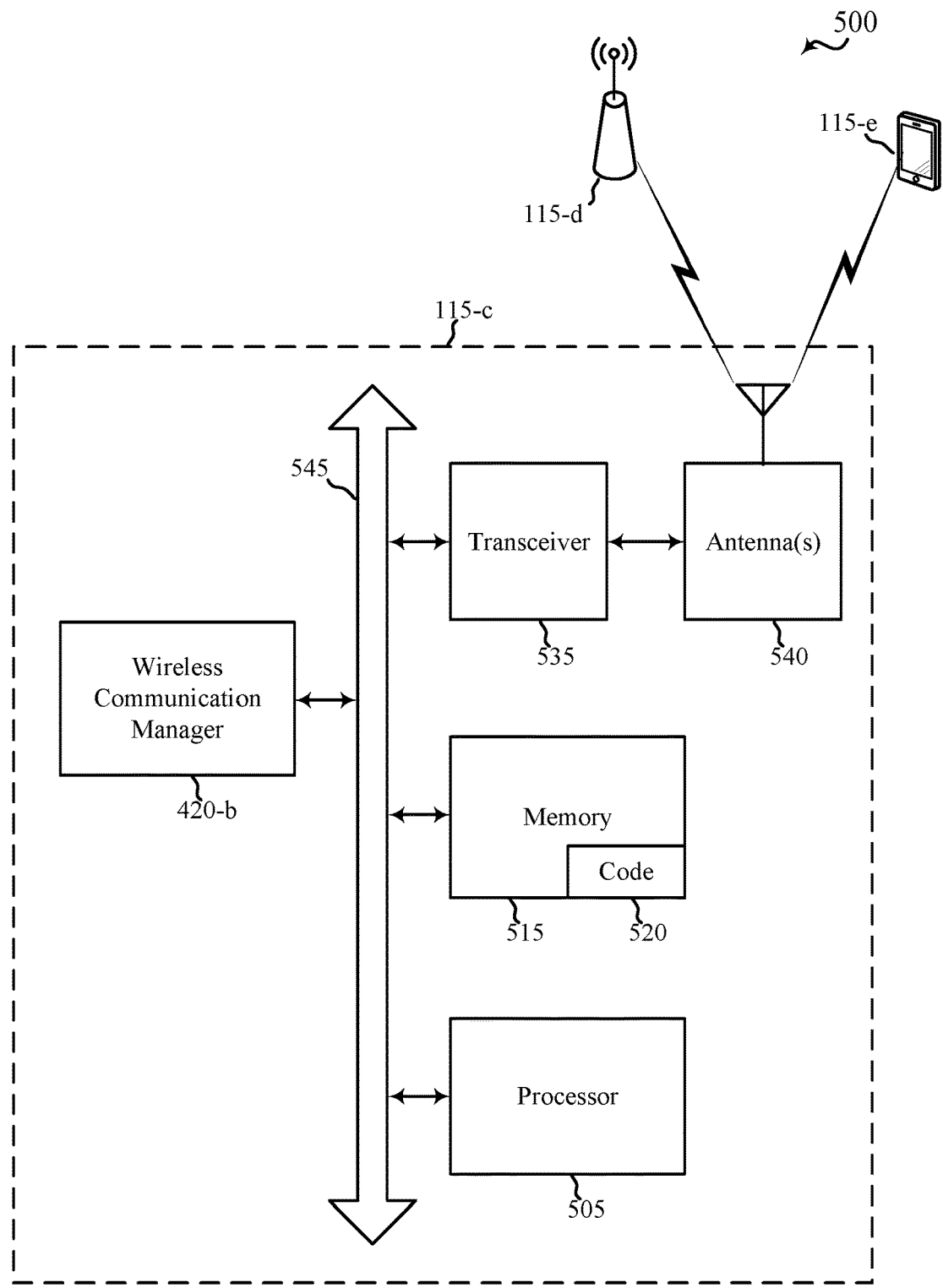
FIG. 5 shows a diagram of a system including a station (e.g., a WLAN station), in accordance with various aspects of the present disclosure.

FIG. 5 shows a diagram of a system 500 including a station (e.g., a WLAN station) 115-c, in accordance with various aspects of the present disclosure. The station 115-c may be an example of aspects of a station 115 or device 400 described with reference to FIGS. 1 and 4. The station 115-c may include a wireless communication manager 420-b, which may be an example of aspects of a wireless communication manager 420 described with reference to FIGS. 1 and 4. The station 115-c may also include components for bi-directional voice and/or data communication, including components for transmitting communications and components for receiving communications. For example, the station 115-a may communicate bi-directionally with an AP station 115-d or a non-AP station 115-e.

The station 115-c may also include a processor 505, memory 515 (including computer-executable software/firmware code 520), a transceiver 535, and at least one antenna 540, each of which may communicate, directly or indirectly, with one another (e.g., via buses 545). The transceiver 535 may communicate bi-directionally, via the antenna(s) 540 or wired or wireless links, with at least one network, as described in the present disclosure. For example, the transceiver 535 may communicate bi-directionally with an AP station 115-d or a non-AP station 115-e. The transceiver 535 may include a modem to modulate packets and provide the modulated packets to the antenna(s) 540 for transmission, and to demodulate packets received from the antenna(s) 540. While the station 115-c may include a single antenna 540, the station 115-c may also have multiple antennas 540 capable of concurrently transmitting or receiving multiple wireless transmissions.

The memory 515 may include random access memory (RAM) and/or read-only memory (ROM). The memory 515 may store computer-readable, computer-executable software/firmware code 520 including instructions that, when executed, cause the processor 505 to perform various functions described herein (e.g., transmission of one or more WLAN frames including a control field having the information described with reference to FIGS. 2-4, etc.). Alternatively, the computer-executable software/firmware code 520 may not be directly executable by the processor 505 but may cause a computer (e.g., when compiled and executed) to perform functions described herein. The processor 505 may include an intelligent hardware device, (e.g., a central processing unit (CPU), a microcontroller, an application-specific integrated circuit (ASIC), etc.).

Figure 6:
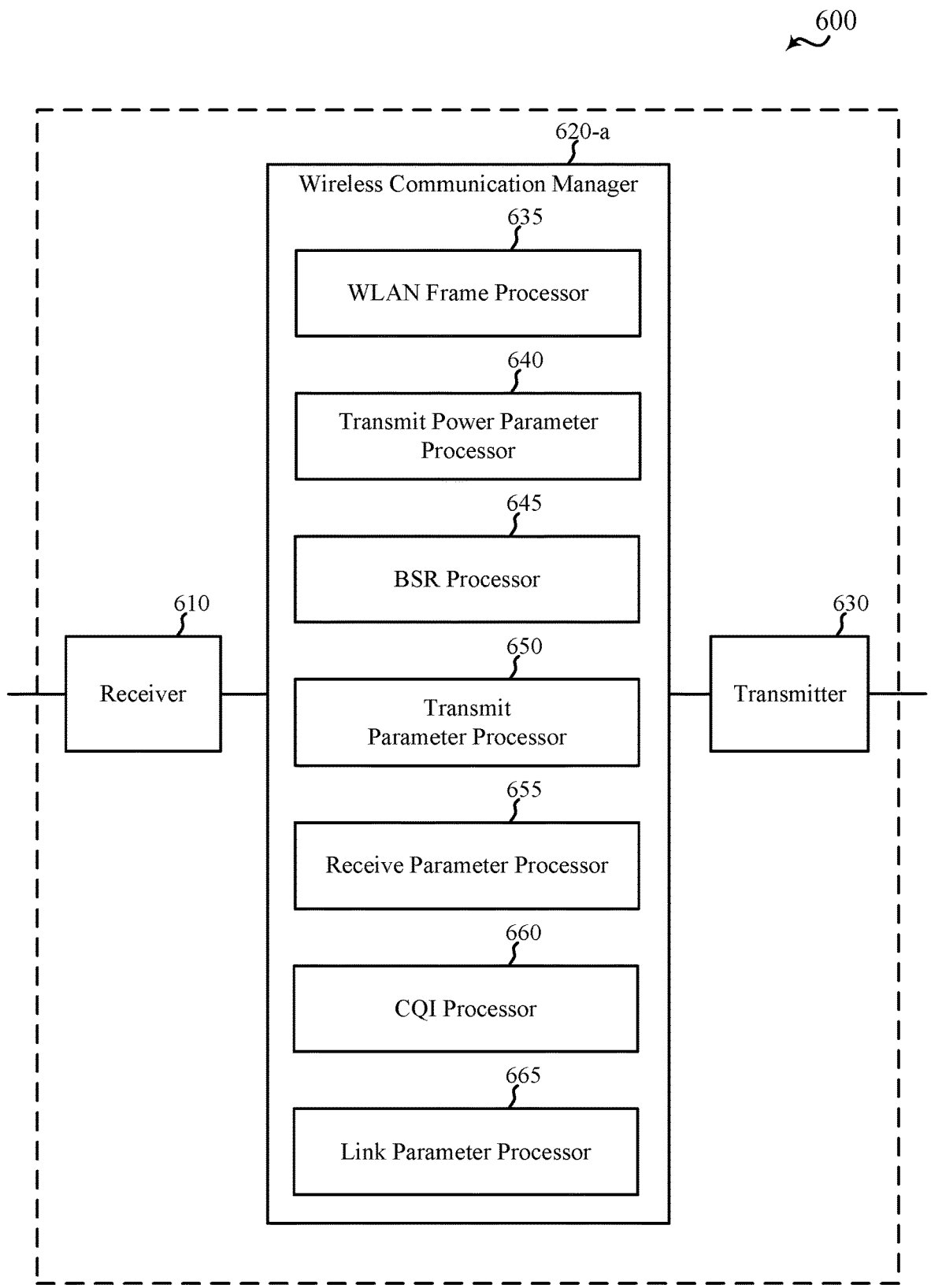
FIG. 6 shows a block diagram of a device used for wireless communication at a first station (e.g., a WLAN AP station), in accordance with various aspects of the present disclosure.

FIG. 6 shows a block diagram of a device 600 used for wireless communication at a first station (e.g., a WLAN AP station), in accordance with various aspects of the present disclosure. The device 600 may be an example of aspects of an AP station 115 described with reference to FIG. 1. The device 600 may include a receiver 610, a wireless communication manager 620-a, and/or a transmitter 630. The device 600 may also include a processor. Each of these components may be in communication with each other.

The receiver 610 may be used to receive information such as packets, user data, or control information associated with various information channels (e.g., control channels, data channels, etc.) and/or frames (e.g., WLAN frames of trigger-based PPDUs, WLAN frames of non-trigger-based PPDUs, etc.). Received information may be passed to the wireless communication manager 620-a and/or to other components of the device 600. The receiver 610 may include (or be associated) with one or multiple antennas.

The wireless communication manager 620-a may include a WLAN frame processor 635, a transmit power parameter processor 640, a BSR processor 645, a transmit parameter processor 650, a receive parameter processor 655, a CQI processor 660, and/or a link parameter processor 665.

The WLAN frame processor 635 may be used to receive, in a control field carried in one or more WLAN frames included in a PPDU received in response to a soliciting frame transmitted by the first station, at least one of: first information identifying at least one transmit power parameter of a second station, or second information identifying at least one of: a BSR of the second station, or at least one transmit parameter of the second station (including, in some examples, a change in at least one transmit parameter), or at least one receive parameter of the second station (including, in some examples, a change in at least one receive parameter), or CQI, or at least one link parameter (including, in some examples, a change in at least one link parameter), or a combination thereof. The at least one transmit power parameter may include a transmit power headroom of the second station. In some examples, the first information and at least part of the second information may be received in a same control information subfield of the control field, as described with reference to FIG. 2. In some examples, the first information may be received in a first control information subfield of the control field, and at least part of the second information may be received in a second control information subfield of the control field (i.e., the first control information subfield and the second control information subfield may be received in the same control field), as described with reference to FIG. 3. In some examples, the PPDU may be received from the second station with at least one other PPDU received from at least one other station in a trigger-based PPDU format solicited by the first station. In some examples, each PPDU of the PPDU received from the second station and the at least one other PPDU received from the at least one other station may be received on resources that are orthogonal in at least one of: frequency, or space, or time, or a combination thereof.

The WLAN frame processor 635 may also be used to receive, in the control field carried in the one or more WLAN frames, at least one of: first information identifying the at least one transmit power parameter of the second station, or second information identifying at least one of: a BSR of the second station, or the at least one transmit parameter of the second station (including, in some examples, a change in at least one transmit parameter), or the at least one receive parameter of the second station (including, in some examples, a change in at least one receive parameter), or CQI, or at least one link parameter (including, in some examples, a change in at least one link parameter), or a combination thereof. The at least one transmit power parameter may include a transmit power headroom of the second station. In some examples, the first information and at least part of the second information may be received in a same control information subfield of the control field, as described with reference to FIG. 2. In some examples, the first information may be received in a first control information subfield of the control field, and at least part of the second information may be received in a second control information subfield of the control field (i.e., the first control information subfield and the second control information subfield may be received in the same control field), as described with reference to FIG. 3. The WLAN frame processor 635 may also generate a soliciting frame to be transmitted (e.g., via the transmitter 630) to the second station.

The parameter processors (e.g., the transmit power parameter processor 640, the BSR processor 645, the transmit parameter processor 650, the receive parameter processor 655, the CQI processor 660, and/or the link parameter processor 665) may be used to identify at least one of: the at least one transmit power parameter of the second station, or the BSR of the second station, or the at least one transmit parameter of the second station, or the at least one receive parameter of the second station, or the CQI, or the at least one link parameter, or a combination thereof.

In some examples, the WLAN frame processor 635 may be used to receive the second information in the control field carried in the WLAN frame, and the second information may include at least one of: a first indication of whether an uplink multi-user mode is disabled at the second station, or a second indication of a maximum number of transmit spatial streams usable for WLAN communication at the second station, or a combination thereof. In some of these examples, and when the first indication indicates the uplink multi-user mode is disabled at the second station, the WLAN frame processor 635 may interpret the first information as invalid.

In some examples, the WLAN frame processor 635 may be used to receive the first information in the control field carried in the one or more WLAN frames, and the transmit power parameter processor 640 may be used to identify the at least one transmit power parameter of the second station from the first information. In some examples, the first information may include an indication (e.g., a first indication) of the transmit power headroom at the second station. In some examples, the indication of the transmit power headroom may include an indication of a difference between a maximum transmit power of the second station and a transmit power used by the second station for a WLAN frame. In some examples, the first information may additionally or alternatively include an indication (e.g., a second indication) of whether a minimum transmit power of a current MCS of a trigger-based PPDU is reached at the second station. In some examples, the second information may be received, and the second information may include an indication of whether a maximum transmit power of the station will fluctuate following receipt of a trigger-based PPDU by the first station.

The transmitter 630 may be used to transmit information received from other components of the device 600, including information received from the wireless communication manager 620-a. The information may include, for example, packets, user data, or control information associated with various information channels (e.g., control channels, data channels, etc.) and/or frames (e.g., WLAN frames of trigger-based PPDUs, WLAN frames pf non-trigger-based PPDUs, etc.). In some examples, the transmitter 630 may be collocated with the receiver 610 in a transceiver. The transmitter 630 may include (or be associated) with one or multiple antennas, which antenna(s) may be the same as, or different from, the antenna(s) used by the receiver 610.

Figure 7:
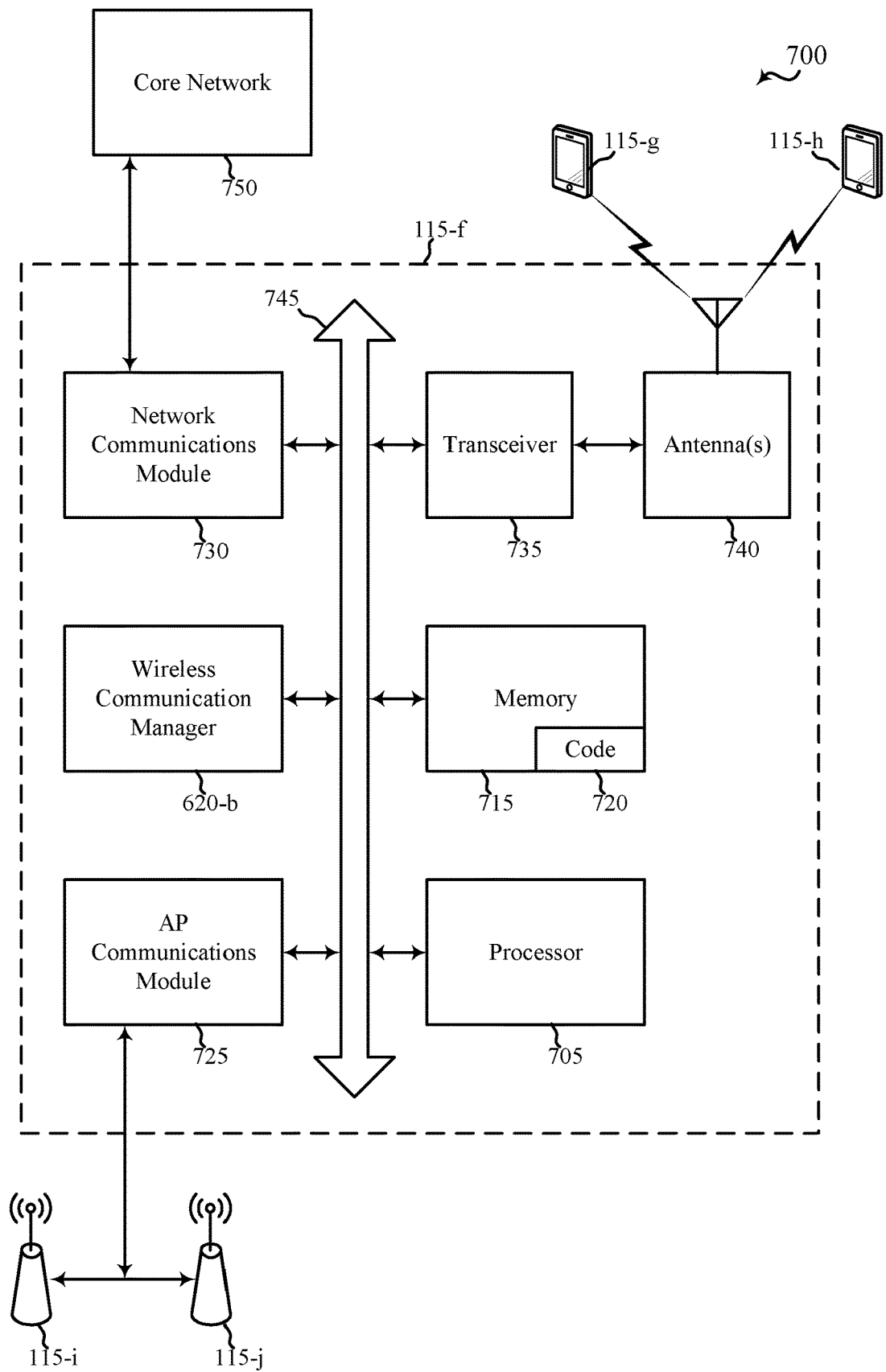
FIG. 7 shows a diagram of a system including an AP station (e.g., a WLAN AP station), in accordance with various aspects of the present disclosure.

FIG. 7 shows a diagram of a system 700 including an AP station (e.g., a WLAN AP station) 115-$f$, in accordance with various aspects of the present disclosure. The AP station 115-$f$ may be an example of aspects of an AP station 115 or device 600 described with reference to FIGS. 1 and 6. The AP station 115-$f$ may include a wireless communication manager 620-$b$, which may be an example of aspects of the wireless communication manager 620 described with reference to FIGS. 1 and 6. The AP station 115-$f$ may also include components for bi-directional voice and/or data communication, including components for transmitting communications and components for receiving communications. For example, the AP station 115-$f$ may communicate bi-directionally with non-AP stations (e.g., WLAN non-AP stations) 115-$g$ and 115-$h$ and/or other AP stations 115-$i$ and 115-$j$.

In some cases, the AP station 115-$f$ may have a wired or wireless backhaul link. For example, the AP station 115-$f$ may have a wireless backhaul link to a core network 750. In some cases, the AP station 115-$f$ may communicate with other AP stations (e.g., the AP station 115-$i$ or the AP station 115-$j$) utilizing AP communications module 725. In some examples, the AP communications module 725 may provide an X2 interface within a Long Term Evolution (LTE)/LTE-A wireless communication network technology to provide communication between some of the APs. In some cases, the AP station 115-$f$ may communicate with the core network 750 through a network communications module 730.

The AP station 115-$f$ may include a processor 705, memory 715 (including computer-executable software/firmware code 720), transceivers 735, and at least one antenna 740, each of which may be in communication, directly or indirectly, with one another (e.g., over buses 745). The transceivers 735 may be configured to communicate bi-directionally, via the antenna(s) 740, with the stations 115-$g$ and 115-$h$, which in some cases may be multi-mode devices. The transceivers 735 (or other components of the AP station 115-$f$) may also be configured to communicate bi-directionally, via the antenna(s) 740, with at least one other AP station (not shown). The transceivers 735 may include a modem configured to modulate packets and provide the modulated packets to the antenna(s) 740 for transmission, and to demodulate packets received from the antenna(s) 740. The AP station 115-$f$ may include multiple transceivers 735, each of which may be associated with at least one of the antenna(s) 740. Each of the transceivers 735 may be an example of a combined receiver 610 and transmitter 630 of FIG. 6.

The memory 715 may include RAM and/or ROM. The memory 715 may store computer-readable, computer-executable software/firmware code 720 including instructions that, when executed, cause the processor 705 to perform various functions described herein (e.g., reception of one or more WLAN frames including a control field having the information described with reference to FIGS. 2, 3, and 6, etc.). Alternatively, the computer-executable software/firmware code 720 may not be directly executable by the processor 705 but may cause a computer, (e.g., when compiled and executed) to perform functions described herein. The processor 705 may include an intelligent hardware device, (e.g., a CPU, a microcontroller, an ASIC, etc.). The processor 705 may include various special purpose processors such as encoders, queue processing modules, base band processors, radio head controllers, digital signal processor (DSPs), and the like.

The electronic or communication components of the stations 115, device 400 or device 600, or wireless communication manager 420 or wireless communication manager 620 may, individually or collectively, be implemented using at least one ASIC adapted to perform some or all of the applicable functions in hardware. Alternatively, the functions may be performed by at least one other processing unit (or core), on at least one integrated circuit (IC). In other examples, other types of integrated circuits may be used (e.g., Structured/Platform ASICs, field programmable gate arrays (FPGAs), Systems on a Chip (SOCs), or other semi-custom ICs), which may be programmed in any manner known in the art. The functions of each unit may also be implemented, in whole or in part, with instructions embodied in a memory, formatted to be executed by at least one general or application-specific processor.

Figure 8:
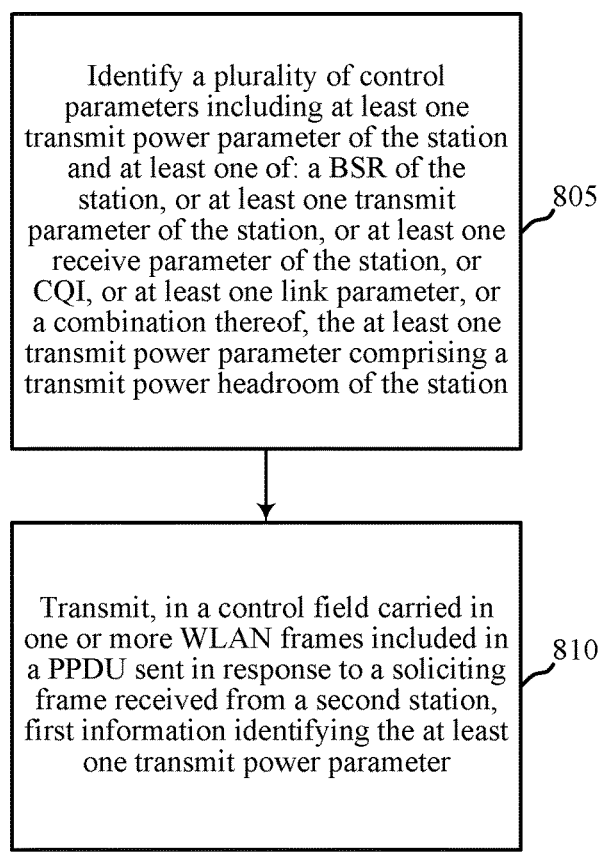
FIG. 8 shows a flowchart illustrating a method for wireless communication at a station (e.g., a WLAN station), in accordance with various aspects of the present disclosure.

FIG. 8 shows a flowchart illustrating a method 800 for wireless communication at a station (e.g., a WLAN station), in accordance with various aspects of the present disclosure. The operations of method 800 may be implemented by a station 115, device 400, or its components, as described with reference to FIGS. 1-5. For example, the operations of method 800 may be performed by a wireless communication manager 420, as described with reference to FIGS. 1, 4, and 5. In some examples, a station may execute a set of codes to control the functional elements of the station to perform the functions described below. Additionally or alternatively, the station may perform aspects of the functions described below using special-purpose hardware.

At block 805, the station may identify a plurality of control parameters including at least one transmit power parameter of the station and at least one of: a BSR of the station, or at least one transmit parameter of the station (including, in some examples, a change in at least one transmit parameter), or at least one receive parameter of the station (including, in some examples, a change in at least one receive parameter), or a CQI, or at least one link parameter (including, in some examples, a change in at least one link parameter), or a combination thereof, as described with reference to FIGS. 2-5. The at least one transmit power parameter may include a transmit power headroom of the station. In certain examples, the operations of block 805 may be performed by the wireless communication manager 420 described with reference to FIGS. 1, 4, and 5, or the transmit power parameter manager 435, BSR manager 440, transmit parameter manager 445, receive parameter manager 450, CQI manager 455, or link parameter manager 460 described with reference to FIG. 4.

At block 810, the station may transmit, in a control field carried in one or more WLAN frames included in a PPDU sent in response to a soliciting frame received from a second station, first information. In some cases, the first information identifies the at least one transmit power parameter. In some examples, the station may also transmit, in the control field, second information identifying at least one of: the BSR, or the at least one transmit parameter of the station, or the at least one receive parameter of the station, or the CQI, or the at least one link parameter, or a combination thereof, as described with reference to FIGS. 2-5. In some examples, the first information and at least part of the second information may be transmitted in a same control information subfield of the control field, as described with reference to FIG. 2. In some examples, the first information may be transmitted in a first control information subfield of the control field, and the second information may be transmitted in a second control information subfield of the control field (i.e., the first control information subfield and the second control information subfield may be transmitted in the same control field), as described with reference to FIG. 3. In some examples, the PPDU may be sent with at least one other PPDU of at least one other station in a trigger-based PPDU format solicited by the second station or another station. In some examples, each PPDU of the PPDU sent by the station and the at least one other PPDU sent by the at least one other station may be sent on resources that are orthogonal in at least one of: frequency, or space, or time, or a combination thereof. In certain examples, the operations of block 810 may be performed by the wireless communication manager 420 described with reference to FIGS. 1, 4, and 5, or the WLAN frame manager 465 described with reference to FIG. 4.

In some examples of the method 800, a change in the at least one transmit parameter of the station may be identified, and the second information may include at least one of: a first indication of whether an uplink multi-user mode is disabled at the station, or a second indication of a maximum number of transmit spatial streams usable for WLAN communication at the station, or a combination thereof. In some of these examples, and when the first indication indicates the uplink multi-user mode is disabled at the station, the method 800 may refrain from transmitting the at least one transmit power parameter in the control field at block 810.

In some examples of the method 800, the first information may include an indication of whether a minimum transmit power of a current MCS of a trigger-based PPDU is reached at the station. In some examples, the first information may additionally or alternatively include an indication of a difference between a maximum transmit power of the station and a transmit power used by the station for a WLAN frame. In some examples, the second information may include an indication of whether a maximum transmit power of the station will fluctuate following transmission of a trigger-based PPDU.

Figure 9:
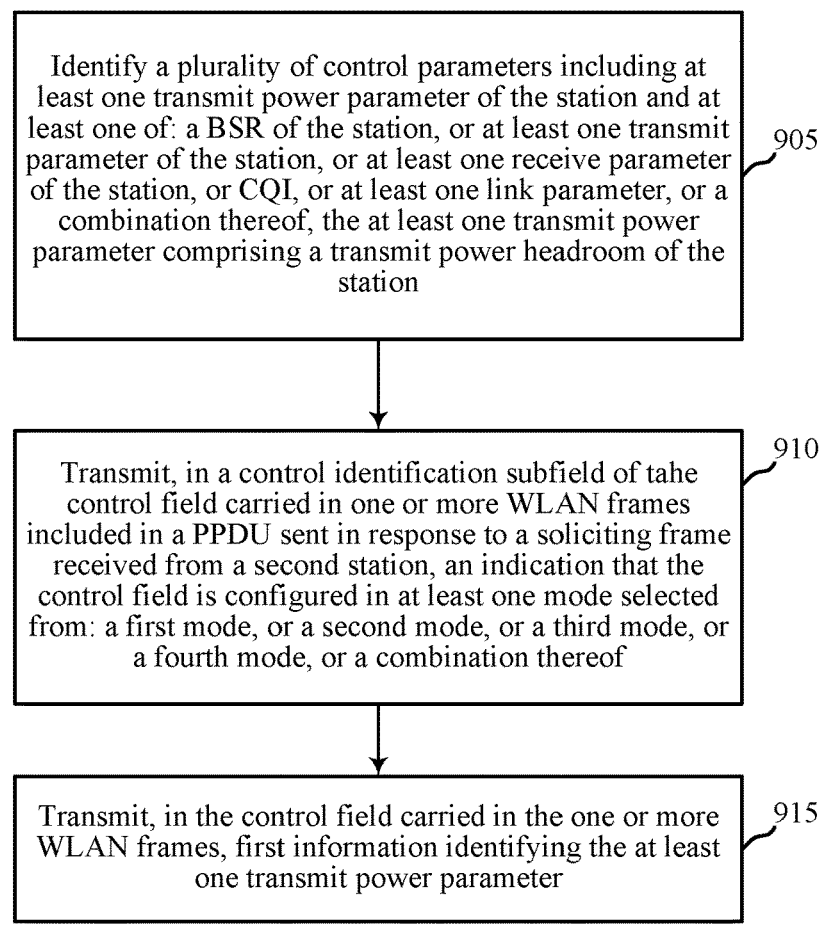
FIG. 9 shows a flowchart illustrating a method for wireless communication at a station (e.g., a WLAN station), in accordance with various aspects of the present disclosure.

FIG. 9 shows a flowchart illustrating a method 900 for wireless communication at a station (e.g., a WLAN station), in accordance with various aspects of the present disclosure. The operations of method 900 may be implemented by a station 115, device 400, or its components, as described with reference to FIGS. 1-5. For example, the operations of method 900 may be performed by a wireless communication manager 420, as described with reference to FIGS. 1, 4, and 5. In some examples, a station may execute a set of codes to control the functional elements of the station to perform the functions described below. Additionally or alternatively, the station may perform aspects of the functions described below using special-purpose hardware.

At block 905, the station may identify a plurality of control parameters including at least one transmit power parameter of the station and at least one of: a BSR of the station, or at least one transmit parameter of the station (including, in some examples, a change in at least one transmit parameter), or at least one receive parameter of the station (including, in some examples, a change in at least one receive parameter), or a CQI, or at least one link parameter (including, in some examples, a change in at least one link parameter), or a combination thereof, as described with reference to FIGS. 2-5. The at least one transmit power parameter may include a transmit power headroom of the station. In certain examples, the operations of block 905 may be performed by the wireless communication manager 420 described with reference to FIGS. 1, 4, and 5, or the transmit power parameter manager 435, BSR manager 440, transmit parameter manager 445, receive parameter manager 450, CQI manager 455, or link parameter manager 460 described with reference to FIG. 4.

At block 910, the station may transmit, in a control identification subfield of a control field carried in one or more WLAN frames included in a PPDU sent in response to a soliciting frame received from a second station, an indication that the control field is configured in at least one mode selected from: a first mode in which the station expects to be solicited for a trigger-based PPDU (e.g., an uplink multi-user PPDU) that carries an immediate acknowledgement, or a second mode in which the station identifies the at least one transmit parameter of the station, or a third mode in which the station identifies the at least one receive parameter of the station, or a fourth mode in which the station identifies the at least one transmit power parameter of the station, or a combination thereof. In some examples, the PPDU may be sent with at least one other PPDU of at least one other station in a trigger-based PPDU format solicited by the second station or another station. In some examples, each PPDU of the PPDU sent by the station and the at least one other PPDU sent by the at least one other station may be sent on resources that are orthogonal in at least one of: frequency, or space, or time, or a combination thereof. In certain examples, the operations of block 910 may be performed by the wireless communication manager 420 described with reference to FIGS. 1, 4, and 5, or the WLAN frame manager 465 described with reference to FIG. 4.

In some examples, the station may optionally determine that the transmit power headroom has priority (e.g., first priority) for inclusion in the one or more WLAN frames when the one or more WLAN frames are carried in a trigger-based PPDU sent as a response to the soliciting frame.

At block 915, the station may transmit, in the control field carried in the one or more WLAN frames, first information identifying the at least one transmit power parameter. In some examples, the station may also transmit, in the control field, second information identifying at least one of: the BSR, or the at least one transmit parameter of the station, or the at least one receive parameter of the station, or the CQI, or the at least one link parameter, or a combination thereof, as described with reference to FIGS. 2-5. In some examples, the first information and at least part of the second information may be transmitted in a same control information subfield of the control field, as described with reference to FIG. 2. In some examples, the first information may be transmitted in a first control information subfield of the control field, and the second information may be transmitted in a second control information subfield of the control field (i.e., the first control information subfield and the second control information subfield may be transmitted in the same control field), as described with reference to FIG. 3. In certain examples, the operations of block 915 may be performed by the wireless communication manager 420 described with reference to FIGS. 1, 4, and 5, or the WLAN frame manager 465 described with reference to FIG. 4.

Figure 10:
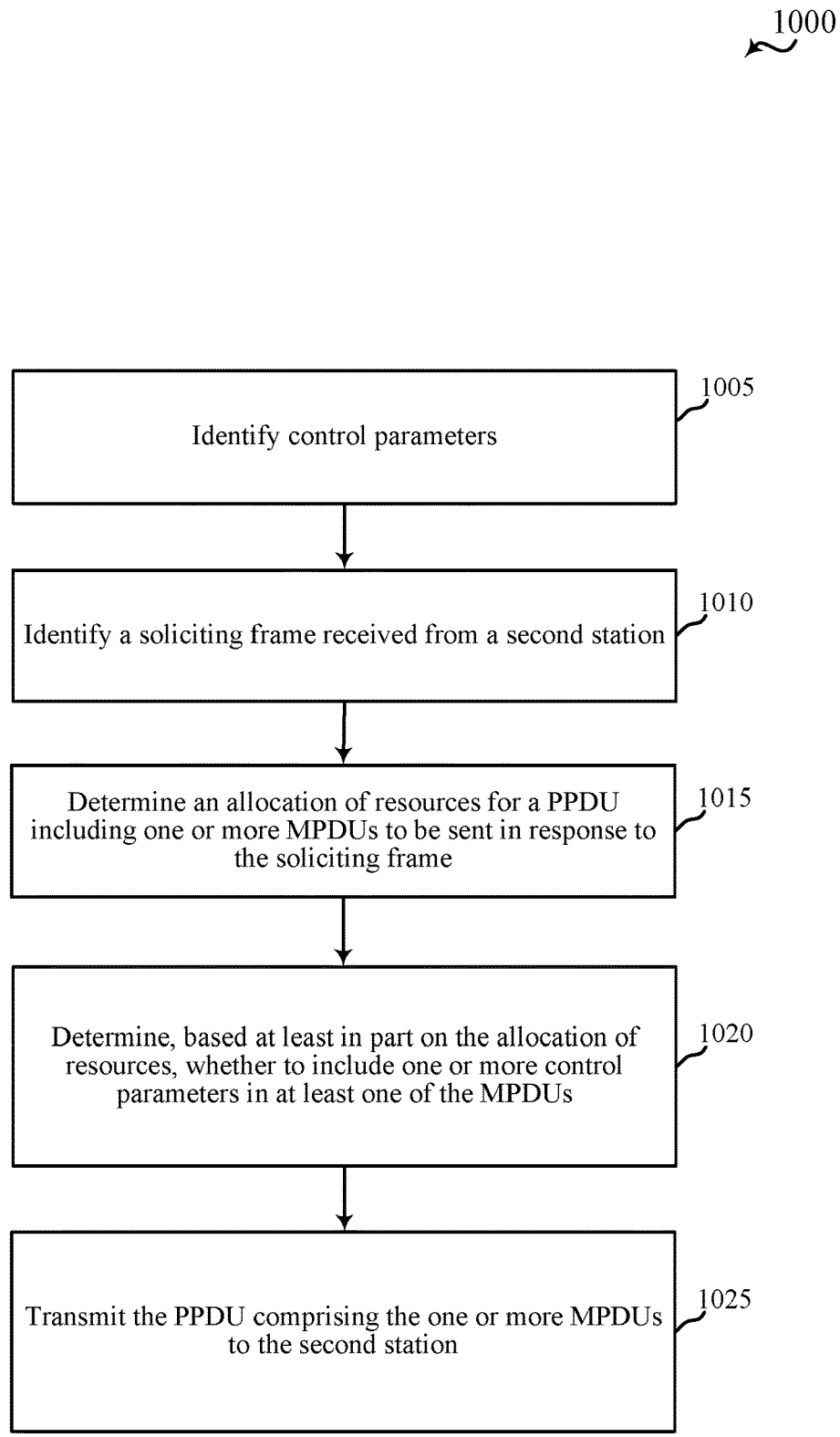
FIG. 10 shows a flowchart illustrating a method for wireless communication at a station (e.g., a WLAN station), in accordance with various aspects of the present disclosure.

FIG. 10 shows a flowchart illustrating a method 1000 for wireless communication at a station (e.g., a WLAN station), in accordance with various aspects of the present disclosure. The operations of method 1000 may be implemented by a station 115, device 400, or its components, as described with reference to FIGS. 1-5. For example, the operations of method 1000 may be performed by a wireless communication manager 420, as described with reference to FIGS. 1, 4, and 5. In some examples, a station may execute a set of codes to control the functional elements of the station to perform the functions described below. Additionally or alternatively, the station may perform aspects of the functions described below using special-purpose hardware.

At block 1005, the station may identify a plurality of control parameters. The plurality of control parameters may include, for example, at least one transmit power headroom parameter of the station, a BSR of the station, a transmit parameter of the station (including, in some examples, a change in at least one transmit parameter), a receive parameter of the station (including, in some examples, a change in at least one receive parameter), a CQI, a link parameter (including, in some examples, a change in at least one link parameter), or a combination thereof, as described with reference to FIGS. 2-5. The at least one transmit power parameter may include a transmit power headroom of the station. In certain examples, the operations of block 1005 may be performed by the wireless communication manager 420 described with reference to FIGS. 1, 4, and 5, or the transmit power parameter manager 435, BSR manager 440, transmit parameter manager 445, receive parameter manager 450, CQI manager 455, or link parameter manager 460 described with reference to FIG. 4.

At block 1010, the station may identify a soliciting frame received from a second station. In certain examples, the operations of block 1010 may be performed by the wireless communication manager 420 described with reference to FIGS. 1, 4, and 5, or the WLAN frame manager 465 described with reference to FIG. 4.

At block 1015, the station may determine an allocation of resources for a PPDU including one or more MPDUs to be sent in response to the soliciting frame. In certain examples, the operations of block 1015 may be performed by the wireless communication manager 420 described with reference to FIGS. 1, 4, and 5, or the WLAN frame manager 465 described with reference to FIG. 4.

At block 1020, the station may determine, based at least in part on the allocation of resources, whether include one or more control parameters of the plurality of control parameters in at least one of the MPDUs. In some examples, the allocation of resources may be indicated in the soliciting frame by one or more parameters including at least one of: a duration of transmission, or at least one frequency resource, or a spatial stream allocation, or an MCS, or a combination thereof. In some examples, the PPDU may be sent with at least one other PPDU of at least one other station in a trigger-based PPDU format solicited by the second station or another station. In some examples, each PPDU of the PPDU sent by the station and the at least one other PPDU sent by the at least one other station may be sent on resources that are orthogonal in at least one of: frequency, or space, or time, or a combination thereof. In certain examples, the operations of block 1020 may be performed by the wireless communication manager 420 described with reference to FIGS. 1, 4, and 5, or the WLAN frame manager 465 described with reference to FIG. 4.

At block 1025, the station may transmit the PPDU comprising the one or more MPDUs to the second station. In certain examples, the operations of block 1025 may be performed by the wireless communication manager 420 described with reference to FIGS. 1, 4, and 5, or the WLAN frame manager 465 described with reference to FIG. 4.

Figure 11:
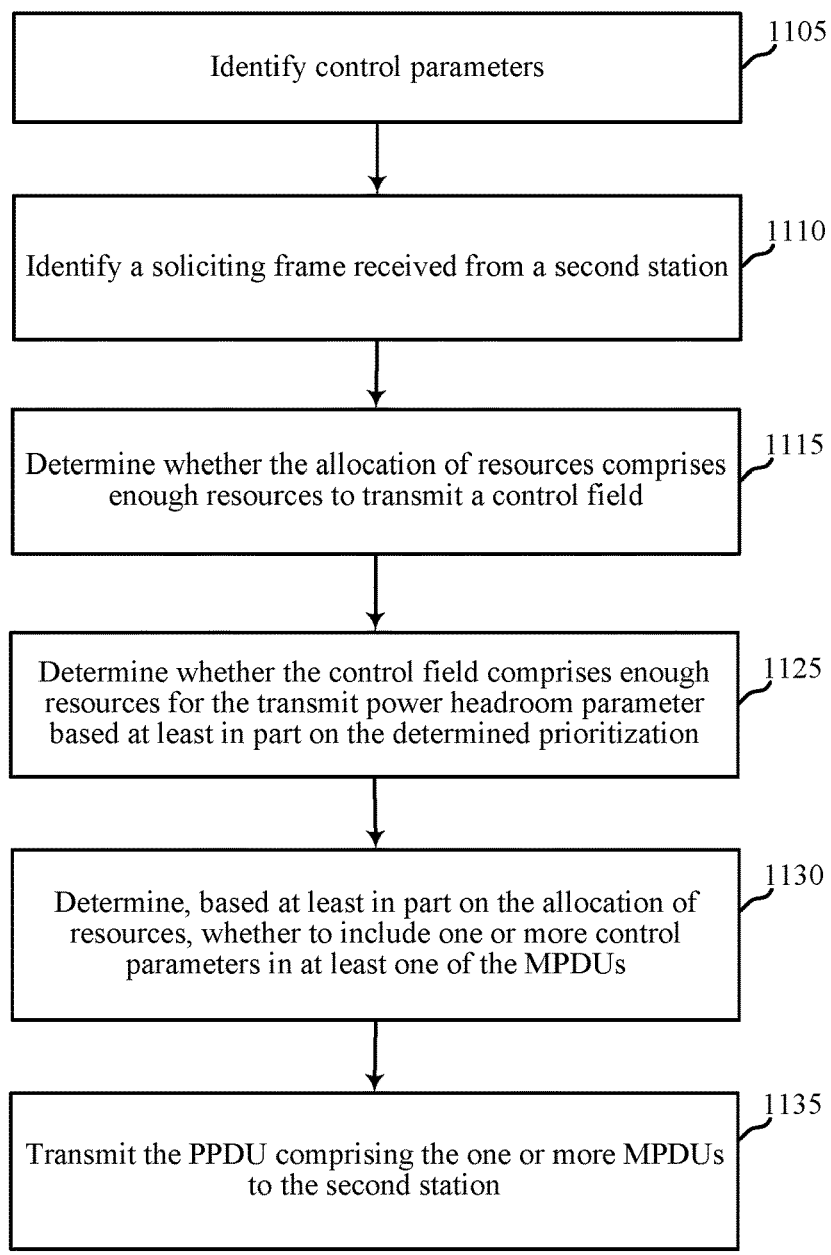
FIG. 11 shows a flowchart illustrating a method for wireless communication at a station (e.g., a WLAN station), in accordance with various aspects of the present disclosure.

FIG. 11 shows a flowchart illustrating a method 1100 for wireless communication at a station (e.g., a WLAN station), in accordance with various aspects of the present disclosure.

The operations of method 1100 may be implemented by a station 115, device 400, or its components, as described with reference to FIGS. 1-5. For example, the operations of method 1100 may be performed by a wireless communication manager 420, as described with reference to FIGS. 1, 4, and 5. In some examples, a station may execute a set of codes to control the functional elements of the station to perform the functions described below. Additionally or alternatively, the station may perform aspects of the functions described below using special-purpose hardware.

At block 1105, the station may identify a plurality of control parameters including at least one transmit power headroom parameter of the station, a BSR of the station, a transmit parameter of the station (including, in some examples, a change in at least one transmit parameter), a receive parameter of the station (including, in some examples, a change in at least one receive parameter), a CQI, a link parameter (including, in some examples, a change in at least one link parameter), or a combination thereof, as described with reference to FIGS. 2-5. The at least one transmit power parameter may include a transmit power headroom of the station. In certain examples, the operations of block 1105 may be performed by the wireless communication manager 420 described with reference to FIGS. 1, 4, and 5, or the transmit power parameter manager 435, BSR manager 440, transmit parameter manager 445, receive parameter manager 450, CQI manager 455, or link parameter manager 460 described with reference to FIG. 4.

At block 1110, the station may identify a soliciting frame received from a second station. In certain examples, the operations of block 1110 may be performed by the wireless communication manager 420 described with reference to FIGS. 1, 4, and 5, or the WLAN frame manager 465 described with reference to FIG. 4.

At block 1115, the station may determine whether the allocation of resources in a PPDU to be sent in response to the soliciting frame comprises enough resources to transmit a control field. For example, the station may determine whether the remaining space in an A-MPDU, after inclusion of solicited MPDUs that cannot contain an HE Control field, is sufficient to contain MPDU(s) that contain an HE Control field. In certain examples, the operations of block 1115 may be performed by the wireless communication manager 420 described with reference to FIGS. 1, 4, and 5, or the WLAN frame manager 465 described with reference to FIG. 4.

If, at block 1115, it is determined that at least one MPDU that contains a control field is to be sent in the PPDU, the station may determine whether the control field comprises enough resources for the transmit power headroom parameter at block 1125. For example, the control field may be an HE Control field and the station may determine whether the HE Control field includes enough resources for the transmit power headroom parameter after inclusion of other control fields. The control fields may be, for example, prioritized by the station for determining the available resources in the control field for the transmit power headroom parameter. In certain examples, the operations of block 1125 may be performed by the wireless communication manager 420 described with reference to FIGS. 1, 4, and 5, or the WLAN frame manager 465 described with reference to FIG. 4.

At block 1130, the station may determine, based at least in part on the allocation of resources, whether to include one or more control parameters of the plurality of control parameters in at least one of the MPDUs In certain examples, the operations of block 1130 may be performed by the wireless communication manager 420 described with reference to FIGS. 1, 4, and 5, or the WLAN frame manager 465 described with reference to FIG. 4.

At block 1135, the station may transmit the PPDU comprising the one or more MPDUs to the second station. In certain examples, the operations of block 1135 may be performed by the wireless communication manager 420 described with reference to FIGS. 1, 4, and 5, or the WLAN frame manager 465 described with reference to FIG. 4.

In some examples, aspects of the methods 800, 900, 1000, or 1100 described with reference to FIG. 8, 9, 10, or 11 may be combined.

Figure 12:
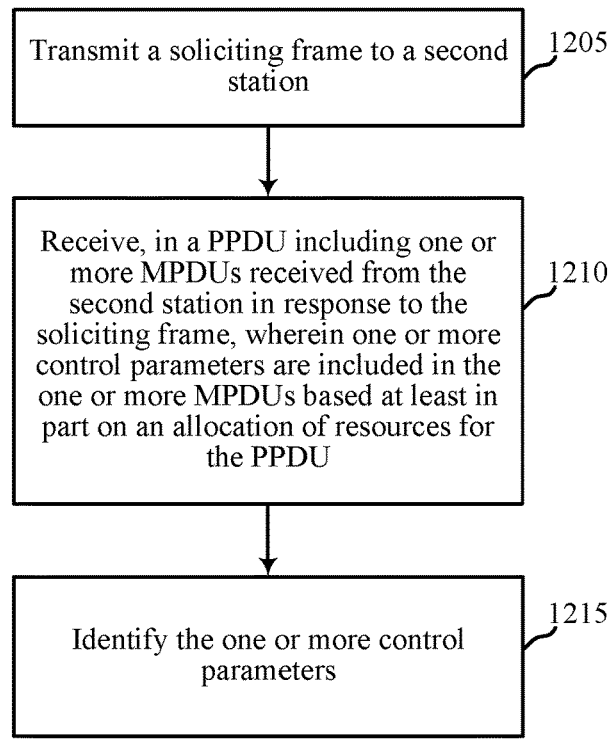
FIG. 12 shows a flowchart illustrating a method for wireless communication at a first station (e.g., a WLAN AP station), in accordance with various aspects of the present disclosure.

FIG. 12 shows a flowchart illustrating a method 1200 for wireless communication at a first station (e.g., a WLAN AP station), in accordance with various aspects of the present disclosure. The operations of method 1200 may be implemented by a station 115, device 600, or its components, as described with reference to FIGS. 1-3, 6, and 7. For example, the operations of method 1200 may be performed by a wireless communication manager 620, as described with reference to FIGS. 1, 6, and 7. In some examples, a first station may execute a set of codes to control the functional elements of the first station to perform the functions described below. Additionally or alternatively, the first station may perform aspects of the functions described below using special-purpose hardware.

At block 1205, the first station may transmit a soliciting frame to a second station. In certain examples, the operations of block 1205 may be performed by the wireless communication manager 620 described with reference to FIGS. 1, 6, and 7, or the WLAN frame processor 635 described with reference to FIG. 6.

At block 1210, the first station may receive, in a PPDU including one or more MPDUs received from a second station in response to a soliciting frame transmitted by the first station, at least one of a plurality of control parameters including at least one of a transmit power headroom parameter of a second station, or second information identifying a buffer status report of the second station, or a transmit parameter of the second station (including, in some examples, a change in at least one transmit parameter), or a receive power parameter of the second station (including, in some examples, a change in at least one receive parameter), channel quality information, a link parameter (including, in some examples, a change in at least one link parameter), or a combination thereof. In some examples, the one or more control parameters are included in the plurality of control parameters based at least in part on an allocation of resources for the PPDU. In some examples, the transmit power headroom and at least one other parameter of the plurality of control parameters is received in a same control information subfield of a control field. In some examples, the transmit power headroom is received in a first control information subfield of a control field, and at least one other parameter of the plurality of control parameters is received in a second control information subfield of the control field. In some examples, a control field is received and comprises at least one of: a first indication of whether an uplink multi-user mode is disabled at the second station, or a second indication of a maximum number of transmit spatial streams usable for WLAN communication at the second station, or a combination thereof. In some examples, the transmit power headroom parameter comprises a second indication of whether a minimum transmit power of a current MCS of a trigger-based PPDU is reached at the second station. In certain examples, the operations of block 1210 may be performed by the wireless communication manager 620 described with reference to FIGS. 1, 6, and 7, or the WLAN frame processor 635 described with reference to FIG. 6.

At block 1215, the first station may identify at least one of: the at least one transmit power headroom parameter of the second station, or the buffer status report of the second station, or the transmit parameter of the second station, or the receive parameter of the second station, or the channel quality information, or the link parameter, or a combination thereof. In certain examples, the operations of block 1215 may be performed by the wireless communication manager 620 described with reference to FIGS. 1, 6, and 7, or the transmit power parameter processor 640, BSR processor 645, transmit parameter processor 650, receive parameter processor 655, CQI processor 660, or link parameter processor 665 described with reference to FIG. 6.

In some examples of the method 1200, a control field may include at least one of: a first indication of whether an uplink multi-user mode is disabled at the second station, or a second indication of a maximum number of transmit spatial streams usable for WLAN communication at the second station, or a combination thereof. In some of these examples, the method 1200 may include determining from the transmit power headroom parameter that the uplink multi-user mode is disabled at the second station and interpreting the transmit power headroom parameter as invalid.

Figure 13:
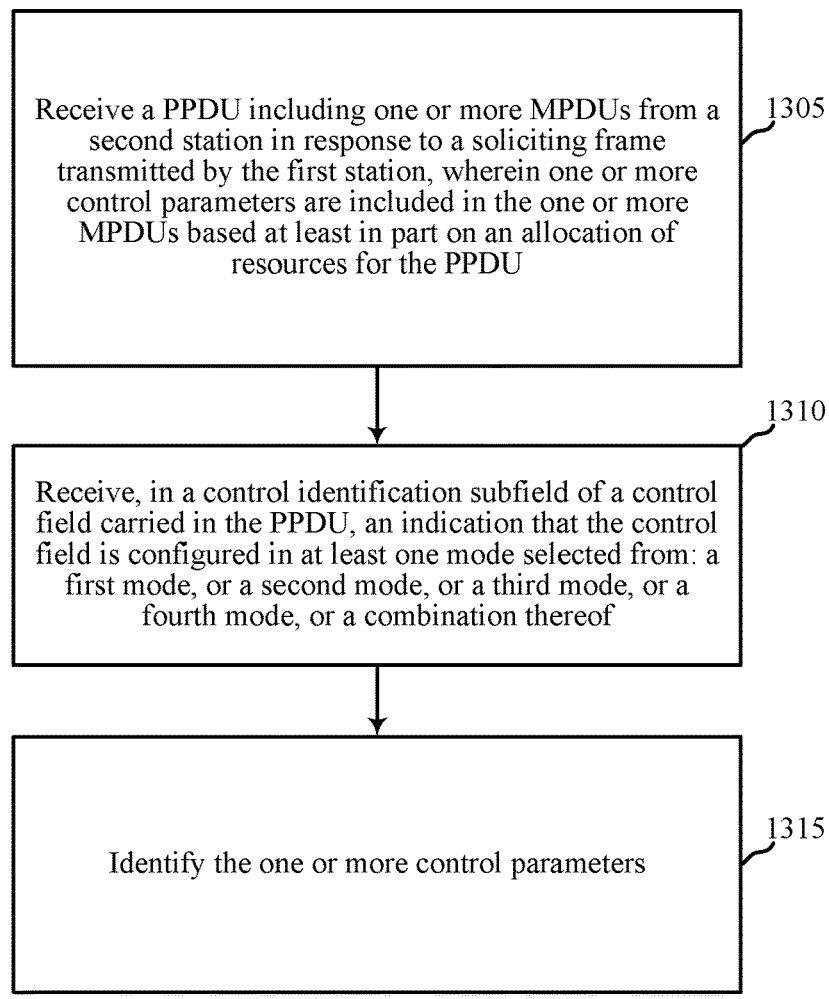
FIG. 13 shows a flowchart illustrating a method for wireless communication at a first station (e.g., a WLAN AP station), in accordance with various aspects of the present disclosure.

FIG. 13 shows a flowchart illustrating a method 1300 for wireless communication at a first station (e.g., a WLAN AP station), in accordance with various aspects of the present disclosure. The operations of method 1300 may be implemented by a station 115, device 600, or its components, as described with reference to FIGS. 1-3, 6, and 7. For example, the operations of method 1300 may be performed by a wireless communication manager 620, as described with reference to FIGS. 1, 6, and 7. In some examples, a first station may execute a set of codes to control the functional elements of the first station to perform the functions described below. Additionally or alternatively, the first station may perform aspects of the functions described below using special-purpose hardware.

At block 1305, the first station may receive, in a PPDU including one or more MPDUs received from a second station in response to a soliciting frame transmitted by the first station, at least one of a plurality of control parameters including at least one of a transmit power headroom parameter of a second station, or second information identifying a buffer status report of the second station, or a transmit parameter of the second station (including, in some examples, a change in at least one transmit parameter), or a receive power parameter of the second station (including, in some examples, a change in at least one receive parameter), channel quality information, a link parameter (including, in some examples, a change in at least one link parameter), or a combination thereof. In some examples, the one or more control parameters are included in the plurality of control parameters based at least in part on an allocation of resources for the PPDU. In some examples, the transmit power headroom and at least one other parameter of the plurality of control parameters is received in a same control information subfield of a control field . . . . In certain examples, the operations of block 1305 may be performed by the wireless communication manager 620 described with reference to FIGS. 1, 6, and 7, or the WLAN frame processor 635 described with reference to FIG. 6.

At block 1310, the first station may receive, in a control identification subfield of a control field carried in the PPDU, an indication that the control field is configured in at least one mode selected from: a first mode, or a second mode, or a third mode, or a fourth mode, or a combination thereof. In some examples, in the first mode the second station expects to be solicited for a trigger-based PPDU that carries an immediate acknowledgement. In some examples, in the second mode the second station identifies the transmit parameter of the second station. In some examples, in the third mode, in which the second station identifies the receive parameter of the second station. In some examples, in the fourth mode, in which the second station identifies the transmit power headroom parameter of the second station. In certain examples, the operations of block 1310 may be performed by the wireless communication manager 620 described with reference to FIGS. 1, 6, and 7, or the WLAN frame processor 635 described with reference to FIG. 6.

At block 1315, the first station may identify at least one of: the at least one transmit power headroom parameter of the second station, or the buffer status report of the second station, or the transmit parameter of the second station, or the receive parameter of the second station, or the channel quality information, or the link parameter, or a combination thereof. In certain examples, the operations of block 1315 may be performed by the wireless communication manager 620 described with reference to FIGS. 1, 6, and 7, or the transmit power parameter processor 640, BSR processor 645, transmit parameter processor 650, receive parameter processor 655, CQI processor 660, or link parameter processor 665 described with reference to FIG. 6.

In some examples, aspects of the methods 1200 and 1300 described with reference to FIGS. 12 and 13 may be combined.

The methods 800, 900, 1000, 1100, 1200, and 1300 describe possible implementation, and the operations and steps of the methods may be rearranged or otherwise modified such that other implementations are possible.

The description herein provides examples, and is not limiting of the scope, applicability, or examples set forth in the claims. Changes may be made in the function and arrangement of elements discussed without departing from the scope of the disclosure. Various examples may omit, substitute, or add various procedures or components as appropriate. Also, features described with respect to some examples may be combined in other examples.

The description set forth herein, in connection with the appended drawings, describes example configurations and does not represent all the examples that may be implemented or that are within the scope of the claims. The term "exemplary" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, well-known structures and devices are shown in block diagram form to avoid obscuring the concepts of the described examples.

In the appended figures, similar components or features may have the same reference label. Additionally or alternatively, various components of the same type may be distinguished by following the reference label by a dash and a second label that distinguishes among the similar components. If just the first reference label is used in the specification, the description is applicable to any one of the similar components having the same first reference label irrespective of the second reference label.

Information and signals described herein may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

The various illustrative blocks and modules described in connection with the disclosure herein may be implemented or performed with a general-purpose processor, a DSP, an ASIC, an FPGA or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices (e.g., a combination of a digital signal processor (DSP) and a microprocessor, multiple microprocessors, at least one microprocessor in conjunction with a DSP core, or any other such configuration).

The functions described herein may be implemented in hardware, software executed by a processor, firmware, or any combination thereof. If implemented in software executed by a processor, the functions may be stored on or transmitted over as at least one instruction or code on a computer-readable medium. Other examples and implementations are within the scope of the disclosure and appended claims. For example, due to the nature of software, functions described above can be implemented using software executed by a processor, hardware, firmware, hardwiring, or combinations of any of these. Features implementing functions may also be physically located at various positions, including being distributed such that portions of functions are implemented at different physical locations. Also, as used herein, including in the claims, "or" as used in a list of items (for example, a list of items prefaced by a phrase such as "at least one of" or "one or more of") indicates an inclusive list such that, for example, a list of at least one of A, B, or C means A or B or C or AB or AC or BC or ABC (i.e., A and B and C).

Computer-readable media includes both non-transitory computer storage media and communication media including any medium that facilitates transfer of a computer program from one place to another. A non-transitory storage medium may be any available medium that can be accessed by a general purpose or special purpose computer. By way of example, and not limitation, non-transitory computer-readable media can comprise RAM, ROM, electrically erasable programmable read-only memory (EEPROM), compact disk (CD) ROM or other optical disk storage, magnetic disk storage or other magnetic storage devices, or any other non-transitory medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, digital subscriber line (DSL), or wireless technologies such as infrared, radio, and microwave are included in the definition of medium. Disk and disc, as used herein, include CD, laser disc, optical disc, digital versatile disc (DVD), floppy disk and Blu-ray disc where disks usually reproduce data magnetically, while discs reproduce data optically with lasers. Combinations of the above are also included within the scope of computer-readable media.

The previous description of the disclosure is provided to enable a person skilled in the art to make or use the disclosure. Various modifications to the disclosure will be readily apparent to those skilled in the art, and the generic principles defined herein may be applied to other variations without departing from the scope of the disclosure. Throughout this disclosure the term "example" or "exemplary" indicates an example or instance and does not imply or require any preference for the noted example. Thus, the disclosure is not to be limited to the examples and designs described herein but is to be accorded the broadest scope consistent with the principles and novel features disclosed herein.

What is claimed is:

1. A method for wireless communication at a station, comprising:
   identifying a plurality of control parameters including at least one of a transmit power headroom parameter of the station, a buffer status report of the station, a transmit parameter of the station, a receive parameter of the station, channel quality information, a link parameter, or a combination thereof;
   identifying a soliciting frame received from a second station;
   determining an allocation of resources for a physical layer convergence protocol (PLCP) packet data unit (PPDU) including one or more Medium Access Control (MAC) Protocol Data Units (MPDUs) to be sent in response to the soliciting frame, the one or more MPDUs including a first type of MPDUs that are solicited by the soliciting frame, wherein the first type of MPDUs are exclusive of one or more control parameters of the plurality of control parameters;
   determining whether to include the one or more control parameters of the plurality of control parameters in at least one of the one or more MPDUs based at least in part on whether the allocation of resources has sufficient resources for a second type of MPDU comprising the one or more control parameters after inclusion of the first type of MPDUs in the PPDU, wherein the second type of MPDUs are not solicited by the soliciting frame; and
   transmitting the PPDU comprising the one or more MPDUs to the second station.

2. The method of claim 1, wherein the PPDU is sent with at least one other PPDU of at least one other station in a trigger-based PPDU format solicited by the second station or another station.

3. The method of claim 2, wherein each PPDU of the PPDU and one or more PPDUs of at least one other PPDU are sent on resources that are orthogonal in at least one of: frequency, or space, or time, or a combination thereof.

4. The method of claim 1, wherein
   the second type of MPDUs include a control field and the first type of MPDUs are exclusive of the control field.

5. The method of claim 4, wherein the control field is included in at least one wireless local area network (WLAN) frame in the PPDU.

6. The method of claim 4, wherein the allocation of resources is indicated in the soliciting frame by one or more parameters including at least one of: a duration of transmission, or at least one frequency resource, or a spatial stream allocation, or a modulation and coding scheme (MCS), or a combination thereof.

7. The method of claim 4, wherein determining whether to include the one or more control parameters comprises:
   determining to include at least one of the second type of MPDUs including the control field; and
   determining whether the control field of the at least one of the second type of MPDUs comprises enough resources for the transmit power headroom parameter after inclusion of at least one other of the plurality of control parameters.

8. The method of claim 7, further comprising:
   determining a prioritization of the one or more control parameters at the station.

9. The method of claim 8, wherein the prioritization is based on a type of the soliciting frame.

10. The method of claim 7, wherein determining the prioritization of the one or more control parameters comprises:
    receiving, from the second station, at least one of the prioritization or a request to transmit the at least one transmit power headroom parameter in a control information of the PPDU.

11. The method of claim 1, wherein the one or more control parameters are included in a control field included in the PPDU.

12. The method of claim 11, wherein the transmit power headroom parameter and at least one other parameter of the plurality of control parameters is transmitted in a same control information subfield of the control field.

13. The method of claim 11, wherein the transmit power headroom parameter is transmitted in a first control information subfield of the control field, and at least one other parameter of the plurality of control parameters is transmitted in a second control information subfield of the control field.

14. The method of claim 11, wherein a change in at least one of the plurality of control parameters is identified, and wherein the control field comprises at least one of: a first indication of whether an uplink multi-user mode is disabled at the station, or a second indication of a maximum number of transmit spatial streams usable for WLAN communication at the station, or a combination thereof.

15. The method of claim 11, wherein the transmit power headroom parameter comprises an indication of whether a minimum transmit power of a current modulation and coding scheme (MCS) of a trigger-based PPDU is reached at the station.

16. The method of claim 11, wherein the transmit power headroom parameter comprises an indication of a difference between a maximum transmit power of the station and a transmit power used by the station for a WLAN frame.

17. The method of claim 11, wherein the control field comprises an indication of whether a maximum transmit power of the station will fluctuate following transmission of a trigger-based PPDU.

18. The method of claim 1, further comprising:
    transmitting, in a control identification subfield of a control field comprising the transmit power headroom parameter carried in the PPDU, an indication that the control field is configured in at least one mode selected from: a first mode in which the station expects to be solicited for a trigger-based PPDU that carries an immediate acknowledgement, or a second mode in which the station identifies the transmit parameter of the station, or a third mode in which the station identifies the receive parameter of the station, or a fourth mode in which the station identifies the transmit power headroom parameter of the station, or a combination thereof.

19. The method of claim 18, further comprising:
    determining that the transmit power headroom has priority for inclusion in one or more WLAN frames when the one or more WLAN frames are carried in the trigger-based PPDU sent as a response to the soliciting frame.

20. A device for wireless communication at a station, comprising:
    processor,
    memory in electronic communication with the processor; and
    instructions stored in the memory and executable by the processor to cause the apparatus to:
        identify a plurality of control parameters including at least one of a transmit power headroom parameter of the station, a buffer status report of the station, a transmit parameter of the station, a receive parameter of the station, channel quality information, a link parameter, or a combination thereof; and
        identify a soliciting frame received from a second station, determine an allocation of resources for a physical layer convergence protocol (PLCP) packet data unit (PPDU) including one or more Medium Access Control (MAC) Protocol Data Units (MPDUs) to be sent in response to the soliciting frame, the one or more MPDUs including a first type of MPDUs that are solicited by the soliciting frame, wherein the first type of MPDUs are exclusive of one or more control parameters of the plurality of control parameters, determine whether to include the one or more control parameters of the plurality of control parameters in at least one of the one or more MPDUs based at least in part on whether the allocation of resources has sufficient resources for a second type of MPDU comprising the one or more control parameters after inclusion of the first type of MPDUs in the PPDU, wherein the second type of MPDUs are not solicited by the soliciting frame, and transmit the PPDU comprising the one or more MPDUs to the second station.

21. The device of claim 20, wherein the PPDU is sent with at least one other PPDU of at least one other station in a trigger-based PPDU format solicited by the second station or another station.

22. The device of claim 21, wherein each PPDU of the PPDU and one or more PPDUs of at least one other PPDU are sent on resources that are orthogonal in at least one of: frequency, or space, or time, or a combination thereof.

23. The device of claim 20, wherein
    the second type of MPDUs include a control field and the first type of MPDUs are exclusive of the control field.

24. The device of claim 23, wherein the control field is included in at least one wireless local area network (WLAN) frame in the PPDU.

25. The device of claim 23, wherein the allocation of resources is indicated in the soliciting frame by one or more parameters including at least one of: a duration of transmission, or at least one frequency resource, or a spatial stream allocation, or a modulation and coding scheme (MCS), or a combination thereof.

26. The device of claim 23, wherein the instructions to determine whether to include one or more control parameters are further executable by the processor to cause the device to:
  determine to include at least one of the second type of MPDUs including the control field; and
  determine whether the control field of the at least one of the second type of MPDUs comprises enough resources for the transmit power headroom parameter after inclusion of at least one other of the plurality of control parameters.

27. The device of claim 26, wherein the instructions are further executable by the processor to cause the device to:
  determine a prioritization of the one or more control parameters in the plurality of control parameters at the station.

28. The device of claim 27, wherein the prioritization is based on a type of the soliciting frame.

29. The device of claim 26, wherein the instructions are further executable by the processor to cause the device to:
  receive from the second station, at least one of the prioritization or a request to transmit the at least one transmit power headroom parameter in a control information of the PPDU.

30. The device of claim 20, wherein the one or more control parameters are included in a control field included in the PPDU.

31. The device of claim 30, wherein the transmit power headroom parameter and at least one other parameter of the plurality of control parameters is transmitted in a same control information subfield of the control field.

32. The device of claim 30, wherein the transmit power headroom parameter is transmitted in a first control information subfield of the control field, and at least one other parameter of the plurality of control parameters is transmitted in a second control information subfield of the control field.

33. The device of claim 30, wherein a change in at least one of the plurality of control parameters is identified, and wherein the control field comprises at least one of: a first indication of whether an uplink multi-user mode is disabled at the station, or a second indication of a maximum number of transmit spatial streams usable for WLAN communication at the station, or a combination thereof.

34. The device of claim 30, wherein the transmit power headroom parameter comprises an indication of whether a minimum transmit power of a current modulation and coding scheme (MCS) of a trigger-based PPDU is reached at the station.

35. The device of claim 30, wherein the transmit power headroom parameter comprises an indication of a difference between a maximum transmit power of the station and a transmit power used by the station for a WLAN frame.

36. The device of claim 30, wherein the control field comprises an indication of whether a maximum transmit power of the station will fluctuate following transmission of a trigger-based PPDU.

37. The device of claim 20, wherein the instructions are further executable by the processor to cause the device to:
  transmit, in a control identification subfield of a control field comprising the transmit power headroom parameter carried in the PPDU, an indication that the control field is configured in at least one mode selected from: a first mode in which the station expects to be solicited for a trigger-based PPDU that carries an immediate acknowledgement, or a second mode in which the station identifies the transmit parameter of the station, or a third mode in which the station identifies the receive parameter of the station, or a fourth mode in which the station identifies the transmit power headroom parameter of the station, or a combination thereof.

38. The device of claim 37, wherein the instructions are further executable by the processor to cause the device to:
  determine that the transmit power headroom has priority for inclusion in one or more WLAN frames when the one or more WLAN frames are carried in the trigger-based PPDU sent as a response to the soliciting frame.

39. A device for wireless communication at a station, comprising:
  means for identifying a plurality of control parameters including at least one of a transmit power headroom parameter of the station, a buffer status report of the station, a transmit parameter of the station, a receive parameter of the station, channel quality information, a link parameter, or a combination thereof;
  means for identifying a soliciting frame received from a second station;
  means for determining an allocation of resources for a physical layer convergence protocol (PLCP) packet data unit (PPDU) including one or more Medium Access Control (MAC) Protocol Data Units (MPDUs) to be sent in response to the soliciting frame, the one or more MPDUs including a first type of MPDUs that are solicited by the soliciting frame, wherein the first type of MPDUs are exclusive of one or more control parameters of the plurality of control parameters;
  means for determining whether to include the one or more control parameters of the plurality of control parameters in at least one of the one or more MPDUs based at least in part on whether the allocation of resources has sufficient resources for a second type of MPDU comprising the one or more control parameters after inclusion of the first type of MPDUs in the PPDU, wherein the second type of MPDUs are not solicited by the soliciting frame; and
  means for transmitting the PPDU comprising the one or more MPDUs to the second station.

40. The device of claim 39, wherein the PPDU is sent with at least one other PPDU of at least one other station in a trigger-based PPDU format solicited by the second station or another station.

41. The device of claim 40, wherein each PPDU of the PPDU and one or more PPDUs of at least one other PPDU are sent on resources that are orthogonal in at least one of: frequency, or space, or time, or a combination thereof.

42. The device of claim 39,
  wherein the second type of MPDUs include a control field and the first type of MPDUs are exclusive of the control field.

43. The device of claim 42, wherein the control field is included in at least one wireless local area network (WLAN) frame in the PPDU.

44. The device of claim 42, wherein the allocation of resources is indicated in the soliciting frame by one or more parameters including at least one of: a duration of transmission, or at least one frequency resource, or a spatial stream allocation, or a modulation and coding scheme (MCS), or a combination thereof.

45. The device of claim 42, further comprising:
  means for determining to include at least one of the second type of MPDUs including the control field; and
  means for determining whether the control field of the at least one of the second type of MPDUs comprises enough resources for the transmit power headroom parameter after inclusion of at least one other of the plurality of control parameters.

46. The device of claim 45, further comprising:
means for determining a prioritization of the one or more control parameters in the plurality of control parameters at the station.

47. The device of claim 46, wherein the prioritization is based on a type of the soliciting frame.

48. A non-transitory computer-readable medium storing computer-executable code for wireless communication at a station, the code executable by a processor to:
identify a plurality of control parameters including at least one of a transmit power headroom parameter of the station, a buffer status report of the station, a transmit parameter of the station, a receive parameter of the station, channel quality information, a link parameter, or a combination thereof;
identify a soliciting frame received from a second station;
determine an allocation of resources for a physical layer convergence protocol (PLCP) packet data unit (PPDU) including one or more Medium Access Control (MAC) Protocol Data Units (MPDUs) to be sent in response to the soliciting frame, the one or more MPDUs including a first type of MPDUs that are solicited by the soliciting frame, wherein the first type of MPDUs are exclusive of one or more control parameters of the plurality of control parameters;
determine whether to include the one or more control parameters of the plurality of control parameters in at least one of the one or more MPDUs based at least in part on whether the allocation of resources has sufficient resources for a second type of MPDU comprising the one or more control parameters after inclusion of the first type of MPDUs in the PPDU, wherein the second type of MPDUs are not solicited by the soliciting frame; and
transmit the PPDU comprising the one or more MPDUs to the second station.

49. The non-transitory computer-readable medium of claim 48, wherein the PPDU is sent with at least one other PPDU of at least one other station in a trigger-based PPDU format solicited by the second station or another station.

50. The non-transitory computer-readable medium of claim 49, wherein each PPDU of the PPDU and one or more PPDUs of at least one other PPDU are sent on resources that are orthogonal in at least one of: frequency, or space, or time, or a combination thereof.

51. A method for wireless communication at a first station, comprising:
transmitting a soliciting frame to a second station;
receiving, in a physical layer convergence protocol (PLCP) packet data unit (PPDU) including one or more Medium Access Control (MAC) Protocol Data Units (MPDUs) received from the second station in response to the soliciting frame, the one or more MPDUs including a first type of MPDUs that are solicited by the soliciting frame, wherein the first type of MPDUs are exclusive of one or more control parameters of a plurality of control parameters, and wherein a second type of MPDUs that are not solicited by the soliciting frame comprise the one or more control parameters of the plurality of control parameters, the plurality of control parameters including a transmit power headroom parameter of a second station, or a buffer status report of the second station, or a transmit parameter of the second station, or a receive power parameter of the second station, or channel quality information, or a link parameter, or a combination thereof, and wherein one or more of the second type of MPDUs are included in the PPDU based at least in part on an allocation of resources for the PPDU having sufficient resources for the second type of MPDU comprising the one or more control parameters after inclusion of the first type of MPDUs in the PPDU; and
identifying at least one of: the transmit power headroom parameter of the second station, or the buffer status report of the second station, or the transmit parameter of the second station, or the receive parameter of the second station, or the channel quality information, or the link parameter, or a combination thereof.

52. The method of claim 51, wherein the transmit power headroom and at least one other parameter of the plurality of control parameters are received in a same control information subfield of a control field included in the second type of MPDUs.

53. The method of claim 51, wherein the transmit power headroom is received in a first control information subfield of a control field included in the second type of MPDUs, and at least one other parameter of the plurality of control parameters is received in a second control information subfield of the control field included in the second type of MPDUs.

54. The method of claim 51, wherein a control field is received and comprises at least one of: a first indication of whether an uplink multi-user mode is disabled at the second station, or a second indication of a maximum number of transmit spatial streams usable for WLAN communication at the second station, or a combination thereof.

55. The method of claim 54, further comprising:
determining from the transmit power headroom parameter that the uplink multi-user mode is disabled at the second station; and
interpreting the transmit power headroom parameter as invalid.

56. The method of claim 51, wherein the transmit power headroom parameter comprises a second indication of whether a minimum transmit power of a current modulation and coding scheme (MCS) of a trigger-based PPDU is reached at the second station.

57. The method of claim 51, wherein the transmit power headroom parameter comprises an indication of a difference between a maximum transmit power of the second station and a transmit power used by the second station for a WLAN frame.

58. The method of claim 51, wherein a control field is received and comprises a second indication of whether a maximum transmit power of the second station will fluctuate following receipt of a trigger-based PPDU by the first station.

59. The method of claim 51, further comprising:
receiving, in a control identification subfield of a control field carried in the PPDU, an indication that the control field is configured in at least one mode selected from: a first mode in which the second station expects to be solicited for a trigger-based PPDU that carries an immediate acknowledgement, or a second mode in which the second station identifies the transmit parameter of the second station, or a third mode in which the second station identifies the receive parameter of the second station, or a fourth mode in which the second station identifies the transmit power headroom parameter of the second station, or a combination thereof.

60. A device for wireless communication at a first station, comprising:
  processor,
  memory in electronic communication with the processor; and
  instructions stored in the memory and executable by the processor to cause the apparatus to:
    transmit a soliciting frame to a second station;
    receive, in a physical layer convergence protocol (PLCP) packet data unit (PPDU) including one or more Medium Access Control (MAC) Protocol Data Units (MPDUs) received from a second station in response to a soliciting frame transmitted by the first station, the one or more MPDUs including a first type of MPDUs that are solicited by the soliciting frame, wherein the first type of MPDUs are exclusive of one or more control parameters of a plurality of control parameters, and wherein a second type of MPDUs that are not solicited by the soliciting frame comprise the one or more control parameters of the plurality of control parameters, the plurality of control parameters including a transmit power headroom parameter of a second station, or second information identifying a buffer status report of the second station, or a transmit parameter of the second station, or a receive power parameter of the second station, or channel quality information, or a link parameter, or a combination thereof, and wherein one or more of the second type of MPDUs are included in the PPDU based at least in part on an allocation of resources for the PPDU having sufficient resources for the second type of MPDU comprising the one or more control parameters after inclusion of the first type of MPDUs in the PPDU; and
    identify at least one of: the transmit power headroom parameter of the second station, or the buffer status report of the second station, or the transmit parameter of the second station, or the receive parameter of the second station, or the channel quality information, or the link parameter, or a combination thereof.

61. The device of claim 60, wherein the transmit power headroom and at least one other parameter of the plurality of control parameters are received in a same control information subfield of a control field included in the second type of MPDUs.

62. The device of claim 60, wherein the transmit power headroom parameter is received in a first control information subfield of a control field included in the second type of MPDUs, and at least part of the second information is received in a second control information subfield of the control field included in the second type of MPDUs.

63. The device of claim 60, wherein a control field is received and comprises at least one of: a first indication of whether an uplink multi-user mode is disabled at the second station, or a second indication of a maximum number of transmit spatial streams usable for WLAN communication at the second station, or a combination thereof.

64. The device of claim 63, wherein the instructions are further executable by the processor to cause the device to:
  determine from the transmit power headroom parameter that the uplink multi-user mode is disabled at the second station; and
  interpret the transmit power headroom parameter as invalid.

65. The device of claim 60, wherein the transmit power headroom parameter comprises a second indication of whether a minimum transmit power of a current modulation and coding scheme (MCS) of a trigger-based PPDU is reached at the second station.

66. The device of claim 60, wherein the transmit power headroom parameter comprises an indication of a difference between a maximum transmit power of the second station and a transmit power used by the second station for a WLAN frame.

67. The device of claim 60, wherein a control field is received and comprises a second indication of whether a maximum transmit power of the second station will fluctuate following receipt of a trigger-based PPDU by the first station.

68. The device of claim 60, wherein the instructions are further executable by the processor to cause the device to:
  receive, in a control identification subfield of a control field carried in the PPDU, an indication that the control field is configured in at least one mode selected from: a first mode in which the second station expects to be solicited for a trigger-based PPDU that carries an immediate acknowledgement, or a second mode in which the second station identifies the transmit parameter of the second station, or a third mode in which the second station identifies the receive parameter of the second station, or a fourth mode in which the second station identifies the transmit power headroom parameter of the second station, or a combination thereof.

69. A device for wireless communication at a first station, comprising:
  means for transmitting a soliciting frame to a second station;
  means for receiving, in a physical layer convergence protocol (PLCP) packet data unit (PPDU) including one or more Medium Access Control (MAC) Protocol Data Units (MPDUs) received from a second station in response to a soliciting frame transmitted by the first station, the one or more MPDUs including a first type of MPDUs that are solicited by the soliciting frame, wherein the first type of MPDUs are exclusive of one or more control parameters of a plurality of control parameters, and a second type of MPDUs that are not solicited by the soliciting frame comprise the one or more control parameters of the plurality of control parameters, the plurality of control parameters including a transmit power headroom parameter of a second station, or second information identifying a buffer status report of the second station, or a transmit parameter of the second station, or a receive power parameter of the second station, or channel quality information, or a link parameter, or a combination thereof, and wherein one or more of the second type of MPDUs are included in the PPDU based at least in part on an allocation of resources for the PPDU having sufficient resources for the second type of MPDU comprising the one or more control parameters after inclusion of the first type of MPDUs in the PPDU; and
  means for identifying at least one of: the transmit power headroom parameter of the second station, or the buffer status report of the second station, or the transmit parameter of the second station, or the receive parameter of the second station, or the channel quality information, or the link parameter, or a combination thereof.

70. The device of claim 69, wherein the transmit power headroom and at least one other parameter of the plurality of control parameters are received in a same control information subfield of a control field included in the second type of MPDUs.

71. The device of claim 69, wherein the transmit power headroom is received in a first control information subfield of a control field included in the second type of MPDUs, and at least one other parameter of the plurality of control parameters is received in a second control information subfield of the control field included in the second type of MPDUs.

72. The device of claim 69, wherein a control field is received and comprises at least one of: a first indication of whether an uplink multi-user mode is disabled at the second station, or a second indication of a maximum number of transmit spatial streams usable for WLAN communication at the second station, or a combination thereof.

73. The device of claim 69, wherein the transmit power headroom parameter comprises a second indication of whether a minimum transmit power of a current modulation and coding scheme (MCS) of a trigger-based PPDU is reached at the second station.

74. A non-transitory computer-readable medium storing computer-executable code for wireless communication at a first station, the code executable by a processor to:

transmit a soliciting frame to a second station;

receive, in a physical layer convergence protocol (PLCP) packet data unit (PPDU) including one or more Medium Access Control (MAC) Protocol Data Units (MPDUs) received from a second station in response to a soliciting frame transmitted by the first station, the one or more MPDUs including a first type of MPDUs that are solicited by the soliciting frame, wherein the first type of MPDUs are exclusive of one or more control parameters of a plurality of control parameters, and a second type of MPDUs that are not solicited by the soliciting frame comprise the one or more control parameters of the plurality of control parameters, the plurality of control parameters including a transmit power headroom parameter of a second station, or second information identifying a buffer status report of the second station, or a transmit parameter of the second station, or a receive power parameter of the second station, or channel quality information, or a link parameter, or a combination thereof, and wherein one or more of the second type of MPDUs are included in the PPDU based at least in part on an allocation of resources for the PPDU having sufficient resources for the second type of MPDU comprising the one or more control parameters after inclusion of the first type of MPDUs in the PPDU; and identify at least one of: the transmit power headroom parameter of the second station, or the buffer status report of the second station, or the transmit parameter of the second station, or the receive parameter of the second station, or the channel quality information, or the link parameter, or a combination thereof.

75. The non-transitory computer-readable medium of claim 74, wherein the transmit power headroom and at least one other parameter of the plurality of control parameters are received in a same control information subfield of a control field included in the second type of MPDUs.

76. The non-transitory computer-readable medium of claim 74, wherein the transmit power headroom is received in a first control information subfield of a control field included in the second type of MPDUs, and at least one other parameter of the plurality of control parameters is received in a second control information subfield of the control field included in the second type of MPDUs.

\* \* \* \* \*